(12) United States Patent
Katkoori et al.

(10) Patent No.: US 12,182,315 B1
(45) Date of Patent: Dec. 31, 2024

(54) LOCKOUT SYSTEMS AND METHODS

(71) Applicant: UNIVERSITY OF SOUTH FLORIDA, Tampa, FL (US)

(72) Inventors: Srinivas Katkoori, Wesley Chapel, FL (US); Sheikh Ariful Islam, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 488 days.

(21) Appl. No.: 17/074,055

(22) Filed: Oct. 19, 2020

Related U.S. Application Data

(60) Provisional application No. 62/916,963, filed on Oct. 18, 2019.

(51) Int. Cl.
G06F 21/72 (2013.01)
H04L 9/08 (2006.01)

(52) U.S. Cl.
CPC ............ G06F 21/72 (2013.01); H04L 9/0816 (2013.01); *H04L 2209/16* (2013.01)

(58) Field of Classification Search
CPC .... G06F 21/72; H04L 9/0816; H04L 2209/16
See application file for complete search history.

(56) References Cited

U.S. PATENT DOCUMENTS

| | | | | |
|---|---|---|---|---|
| 5,206,905 A | * | 4/1993 | Lee | G06F 3/0383 380/46 |
| 6,109,201 A | * | 8/2000 | Petranovic | G06F 30/327 716/108 |
| 6,289,455 B1 | * | 9/2001 | Kocher | H04L 9/0833 713/172 |
| 7,373,539 B2 | * | 5/2008 | Millman | G06F 1/10 713/500 |
| 7,454,617 B2 | * | 11/2008 | Silverbrook | B41J 29/13 726/20 |

(Continued)

FOREIGN PATENT DOCUMENTS

| | | |
|---|---|---|
| CN | 102542191 A | 7/2012 |
| JP | 2007193529 A | 8/2007 |

(Continued)

OTHER PUBLICATIONS

Search Query Report from IP.com (performed Nov. 17, 2022) (Year: 2022).*

(Continued)

*Primary Examiner* — Sharon S Lynch
(74) *Attorney, Agent, or Firm* — Quarles & Brady LLP

(57) ABSTRACT

An exemplary integrated circuit design lockout system comprises an integrated circuit and a key obfuscated circuit embedded with the integrated circuit. The key obfuscated circuit is configured to verify that a user provides a valid key for the integrated circuit before the user is allowed to operate the integrated circuit. The exemplary integrated circuit design lockout system further comprises a lockout circuit embedded with the key obfuscated circuit, wherein the lockout circuit is configured to allow for a threshold number of failed attempts for the user to provide the valid key before the lockout circuit prohibits the user from making any further attempts at providing the valid key for the integrated circuit.

21 Claims, 22 Drawing Sheets

(56) References Cited

U.S. PATENT DOCUMENTS

| | | | | |
|---|---|---|---|---|
| 8,732,468 | B2* | 5/2014 | Roy | G06F 21/70 |
| | | | | 726/32 |
| 8,892,904 | B2* | 11/2014 | Mirashrafi | G06F 21/57 |
| | | | | 726/4 |
| 9,325,493 | B2 | 4/2016 | Sethumadhavan et al. | |
| 9,678,896 | B2* | 6/2017 | O'Loughlin | H04L 9/3066 |
| 9,767,318 | B1* | 9/2017 | Dropps | G06F 21/72 |
| 9,817,980 | B2* | 11/2017 | Rajendran | G06F 21/602 |
| 10,078,748 | B2* | 9/2018 | Mehta | G06F 21/45 |
| 10,452,567 | B2* | 10/2019 | Lesartre | G06F 3/0679 |
| 10,664,621 | B1* | 5/2020 | Dropps | G06F 21/44 |
| 10,713,350 | B2* | 7/2020 | Mehta | G06F 21/6218 |
| 10,990,580 | B2* | 4/2021 | Sinanoglu | G06F 21/73 |
| 11,200,347 | B1* | 12/2021 | Dropps | G06F 21/44 |
| 11,282,414 | B2* | 3/2022 | Savidis | H04L 9/08 |
| 11,341,283 | B2* | 5/2022 | Alaql | G06F 21/75 |
| 11,902,877 | B2* | 2/2024 | Guo | H04W 28/06 |
| 2002/0099948 | A1* | 7/2002 | Kocher | G06F 21/602 |
| | | | | 713/194 |
| 2004/0111631 | A1* | 6/2004 | Kocher | G06F 21/602 |
| | | | | 713/194 |
| 2004/0168071 | A1* | 8/2004 | Silverbrook | B41J 2/1623 |
| | | | | 713/189 |
| 2006/0174152 | A1* | 8/2006 | Millman | G06F 1/10 |
| | | | | 713/503 |
| 2006/0184807 | A1* | 8/2006 | Kocher | G06F 21/72 |
| | | | | 713/194 |
| 2010/0284539 | A1* | 11/2010 | Roy | H03K 19/17768 |
| | | | | 380/278 |
| 2010/0287374 | A1* | 11/2010 | Roy | G06F 21/70 |
| | | | | 713/171 |
| 2011/0113392 | A1 | 5/2011 | Chakraborty et al. | |
| 2012/0060037 | A1* | 3/2012 | Trimberger | H04L 9/002 |
| | | | | 713/189 |
| 2014/0075550 | A1* | 3/2014 | Mirashrafi | G06F 21/31 |
| | | | | 726/19 |
| 2016/0034694 | A1* | 2/2016 | Rajendran | G06F 30/30 |
| | | | | 713/190 |
| 2016/0077979 | A1* | 3/2016 | Lesartre | A61B 17/72 |
| | | | | 711/164 |
| 2017/0140146 | A1* | 5/2017 | Mehta | H04L 9/3226 |
| 2018/0089426 | A1* | 3/2018 | Shi | G06F 21/755 |
| 2018/0315351 | A1* | 11/2018 | Savidis | G09C 1/04 |
| 2018/0357412 | A1* | 12/2018 | Mehta | H04L 9/0897 |
| 2019/0018936 | A1* | 1/2019 | Zhou | H04L 9/3239 |
| 2019/0129892 | A1* | 5/2019 | Sinanoglu | G06F 16/252 |
| 2020/0065456 | A1* | 2/2020 | Tehranipoor | G06F 21/14 |
| 2021/0173963 | A1* | 6/2021 | Alaql | G06F 21/75 |
| 2022/0256436 | A1* | 8/2022 | Guo | H04L 69/22 |

FOREIGN PATENT DOCUMENTS

| | | |
|---|---|---|
| JP | 2017058994 A | 3/2017 |
| WO | 2008101340 A1 | 8/2008 |

OTHER PUBLICATIONS

Rajendran et al., Fault Analysis-Based Logic Encryption, in IEEE Transactions on Computers, vol. 64, No. 2, pp. 410-424, (Year: Feb. 2015).*

Alkabani et al., Active Hardware Metering for Intellectual Property Protection and Security, In 16th USENIX Security Symposium, 2007, pp. 291-306.

Chakraborty et al., Hardware Protection and Authentication Through Netlist Level Obfuscation, In 2008 IEEE/ACM International Conference on Computer-Aided Design, pp. 674-677.

Chakraborty et al., Security Through Obscurity: An Approach for Protecting Register Transfer Level Hardware IP, In 2009 IEEE International Workshop on Hardware-Oriented Security and Trust, pp. 96-99.

Chakraborty et al., RTL Hardware IP Protection Using Key-Based Control and Data Flow Obfuscation, In 2010 23rd International Conference on VLSI Design, pp. 405-410.

Desai et al., Interlocking Obfuscation for Anti-Tamper Hardware, In Proceedings of the Eighth Annual Cyber Security and Information Intelligence Research Workshop, 2012, pp. 1-4.

Islam et al., DLockout: A Design Lockout Technique for Key Obfuscated RTL IP Designs, In 2019 IEEE International Symposium on Smart Electronic Systems (iSES)(Formerly iNiS), pp. 17-20.

Kumar, Simply Fabless!, IEEE Solid-State Circuits Magazine, 2011, 3(4):8-14.

Meade et al., Netlist Reverse Engineering for High-Level Functionality Reconstruction, In 2016 21st Asia and South Pacific Design Automation Conference (ASP-DAC), IEEE, 2016, pp. 655-660.

Pilato et al., TaintHLS: High-Level Synthesis for Dynamic Information Flow Tracking, IEEE Transactions on Computer-Aided Design of Integrated Circuits and Systems, 2019, 38(5):798-808.

Rajendran et al., Security Analysis of Logic Obfuscation, In Proceedings of the 49th Annual Design Automation Conference, 2012, pp. 83-89.

Standaert et al., An Overview of Power Analysis Attacks Against Field Programmable Gate Arrays, Proceedings of the IEEE, 2006, 94(2):383-394.

* cited by examiner

```
1. int x,y;
2. while (1) {
3.    while (!go_i);
4.    x = x_i;
5.    y = y_i;
6.    while (x!=y) {
7.       if (x < y)
8.          y = y-x;
9.       else
10.         x = x-y;
11.   }
12.   d_o = x;
13. }
```

LOCKOUT SYSTEMS AND METHODS

CROSS-REFERENCE TO RELATED APPLICATION

This application claims priority to U.S. provisional application entitled, "DLOCKOUT: A DESIGN LOCKOUT TECHNIQUE FOR KEY OBFUSCATED RTL IP DESIGNS," having Ser. No. 62/916,963, filed Oct. 18, 2019, which is entirely incorporated herein by reference.

BACKGROUND

In recent decades, horizontal integrated circuit (IC) business model and vertical disintegration in semiconductor design have seen an increased trend in manufacturing and testing of integrated circuit designs in foreign foundries. In the heart of this design ecosystem, original intellectual property (IP) owners for their integrated circuit designs face several security challenges. Frequent IP handover in the supply chain could pose the IP to be vulnerable to unauthorized duplication and piracy. Reverse engineering is commonly employed to execute the variants of IP theft. To reduce the risk of IP theft, the promise of obfuscation transforms the original integrated circuit design into an equivalent design with a greater barrier to uncover functional semantics without a correct key. Conventional obfuscation techniques embed random XOR circuits throughout an IC design which does not protect the design against a removal attack. Ideally, the obfuscation should utilize current resources to transform the design and a maximum cost should be required for performing reverse engineering.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
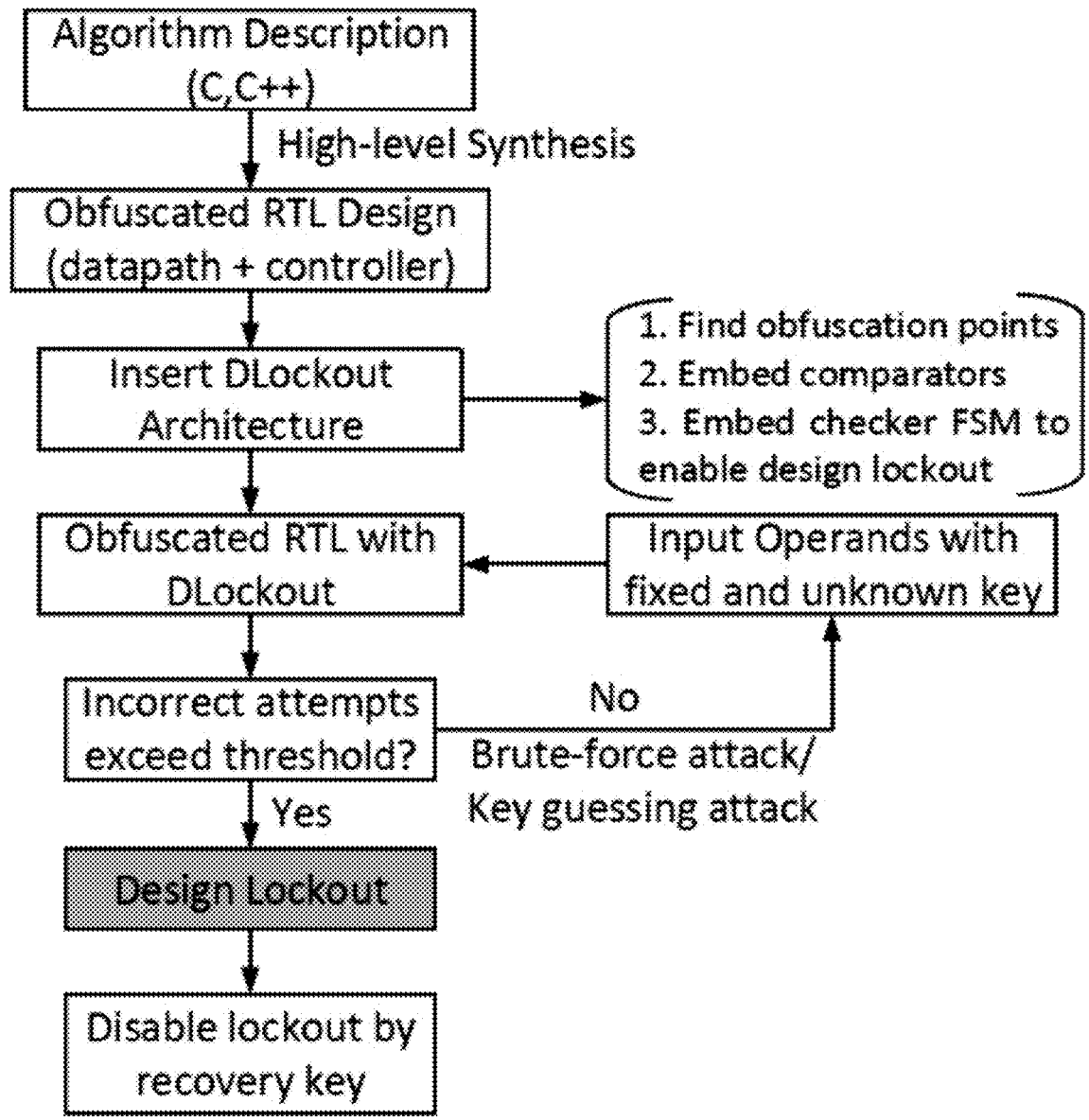
FIG. 1 is a diagram of a design flow for implementing an embodiment of an exemplary design lockout ("DLockout") technique for lockout integration in a key obfuscated Register Transfer Level (RTL) circuit design in accordance with the present disclosure.

The present disclosure various embodiments of a unique design lockout technique (referred in the present disclosure as "DLockout") to improve hardware security based on obfuscation within an integrated circuit. In one embodiment, a lightweight design lockout module (XOR) is coupled with an input obfuscation module (Multiplexer). Both the obfuscation module and the lockout module are configured to enforce correct key propagation throughout an integrated circuit design for seamless operation. Given an obfuscated module, a user is allowed to apply a key for a certain number of trials. If the trial is unsuccessful for a given number of times, the design is self-locked out. Unless a correct key is applied through a recovery line, the lock out will remain active to increase the difficulty of reverse engineering.

Generally, key based obfuscation techniques (i.e., logic locking) are widely applied to secure legacy IP from various reverse engineering attacks. Recent research on logic locking has confirmed the effectiveness of key obfuscation. However, in conventional techniques, an attacker is often allowed an exponential amount of time to seek a correct key, whereas embodiments, in accordance with the present disclosure, implement a lock out security measure in a non-destructive manner after several incorrect attempts.

In accordance with embodiments of the present disclosure, an exemplary DLockout technique provides an add-on module or path to existing hardware IP obfuscation approaches, in which the DLockout technique verifies an applied key to an obfuscated integrated circuit design and if the attempts is more than a predefined value, a lockout module locks out the attacker/user in a non-destructive manner. An IP designer does not need to perform preprocessing about the locations of lockout module if obfuscation modules are known a priori. Moreover, the obfuscation is performed in non-critical paths that avoid frequent executed paths (critical paths) that can result in costly transformations. The required level of obfuscation flow is implemented with low execution time.

In one embodiment of the present disclosure, the obfuscation module or element is a key obfuscated Register Transfer Level (RTL) integrated circuit design and the lockout module features a robust design lockout technique. Specifically, comparisons are performed on an obfuscation logic or module output that reflects the condition (correct or incorrect) of the applied key. A Finite State Machine checker is incorporated to enforce a lockout at the key obfuscated RTL datapath and controller elements. Once locked out, an authorized user can unlock the locked integrated circuit. The disclosed approach, when combined with a key obfuscation (logic locking) technique, increases the difficulty of reverse engineering the key obfuscated RTL module. One novelty of the disclosed technique is that it does not assume that the obfuscation key is stored in the integrated circuit design. From a set of experiments conducted on four datapath intensive integrated circuits and one crypto core for three different key lengths (32-, 64-, and 128-bit) under three design corners, DLockout incurs, on average, negligible area, power, and delay overheads.

The use of hardware obfuscation approaches in recent years is becoming common practice to protect legacy RTL integrated circuit designs. These hardware obfuscation approaches perform transformations to the original FSM (Finite State Machine) by embedding additional states and depending on a key value, they control modes of operation. In these FSM obfuscation techniques, an attacker is supposed to execute additional state transition function(s) to unlock the key or to uncover the structural variations. Typical FSM transformations confirm the fact that the obfuscated RTL is structurally different from an original RTL where the regular functionality is kept valid during unauthorized execution. At the same time, state-of-the-art obfuscation methods have been found to protect only RTL Hardware Description Language and lacks flexibility in securing both the datapath and the controller of an RTL design. Furthermore, existing obfuscation solutions at a Register Transfer Level incur substantial performance overhead while building the security into the hardware. For example, obfuscation using unreachable states may provide good obscurity while incurring significant area overhead. From a defender's point of view, the effectiveness of obfuscation remains in enforcing the attacker with finite resources to perform a brute-force attempt. However, in accordance with the present disclosure, a brute-force obfuscation attempt causes an attacker/user to be locked out early from an integrated circuit design after a finite number of incorrect attempts.

Similarly, for many software schemes, a software owner allows a user (attacker) to a finite number of attempts for legal use of the software. Then, after a finite number of incorrect tries, the software is locked and the user is requested to provide another form of verification to regain access to locked software IP. In various embodiments, a lockout scheme is implemented in obfuscated RTL IP by embedding comparators (XORs) to the obfuscation logic (Multiplexers) in non-critical paths. Following that, a counter is compared with a preset threshold. This threshold determines to what extent (number of attempts) an incorrect key can be applied or input by a user. For each incorrect key retrieval attempt, the counter value is incremented and when it reaches the threshold, the obfuscated module or logic is locked out. The embedded comparators ensure that the applied key (both by the attacker and legal users) are coherent or match with the original key set by the designer. Additionally, a checker FSM in the obfuscated datapath signals the controller during the lockout to enter into a blackhole state. In one embodiment, a recovery scheme can be implemented by the authenticated party that fixes the lockout by reloading all valid key bits through one of the primary inputs. The recovery scheme ensures that all subsequent accesses to the design are valid as long as the correct key is applied, thus maintaining the design for security. An exemplary DLockout technique runs together with the original functionality of an integrated circuit design and requires minimal changes in the obfuscated RTL module to leverage the lockout and recovery.

To the best of our knowledge, embodiments of the DLockout system and method are the first comprehensive technique that enhances traditional key hardware obfuscation with a lockout mechanism. In brief, the novelty of DLockout includes: (i) no storage of a key within the obfuscated module or circuit; (ii) ability to perform systematic integration of comparators to the obfuscation module; (iii) stealthy key propagation through non-critical path(s); and (iv) minimal modifications to an existing obfuscated RTL module or circuit with lightweight, low-overhead comparators and a checker FSM circuit.

The following section gives a brief introduction to conventional key-based hardware obfuscation and obfuscating transformations at RTL against IP piracy. Generally speaking, hardware obfuscation inserts simple logic blocks (e.g., Multiplexer, XOR, etc.) to the combinational design that works as key inputs. With the embedded key, the designer can conceal the input-output relationships without affecting the original functionality. Similar obfuscation can be performed for a sequential design by introducing additional decision nodes (states) before entering a normal mode. In both cases, decompiling the obfuscated structure requires the correct key to enable true functionality. Such transformations can be applied at RT-, gate-, and layout-levels to hide the data and control the flow of the program. The generated RTL from High Level Synthesis (HLS) can be defined by $f(dp,ctrl)$ where dp denotes the datapath containing ALU (Arithmetic Logic Unit), registers, and steering logic. ctrl denotes the controller containing state elements and their corresponding encoding.

With structural obfuscation, an RTL design $f$ can be transformed to $<f_1, f_2, \ldots, f_n>$ where $f_1$ to $f_n$ are obfuscated RTL designs depending on the type, number, and location of obfuscation logic. Mathematically, $$f \xrightarrow{T(k)} <f_1, f_2, \ldots, f_n>,$$

i.e. functional equivalence exists between $f$ and any of the obfuscating transformation from $f_1$ to $f_n$ when the correct key k is applied.

Mode-based RTL obfuscation has been studied in "RTL Hardware IP Protection Using Key-Based Control and Data Flow Obfuscation" (by R. S. Chakraborty and S. Bhunia at VLSID '10, pp. 405-410, Washington, DC, USA, 2010). The technique works by extending the bit-length of host registers for appropriate mode selection with moderate overhead. The authors (R. S. Chakraborty and S. Bhunia) in "Security Through Obscurity: An approach for Protecting Register Transfer Level hardware IP" (in 2009 IEEE HOST, pp. 96-99, July 2009) constructed the Control Flow Graph (CFG) of the RTL description from gate-level designs. In this obfuscation model, extra decision nodes depending on Boolean computations of state elements are inserted. Accordingly, ObfusFlow performs the XOR operation to a subset of internal nodes with an additional FSM. The Boosted Finite State Machine (BFSM) hardens the original FSM by additional states, and the technique powers up the design with additional states such that a random unique block is entered before going into a working mode else a blackhole state mode is entered. Stuttering introduces a slow mode operation for the obfuscated circuit with an external FSM. The authors (A. R. Desai, et al.) in "Interlocking Obfuscation for Anti-Tamper Hardware" (in CSIIRW '13, pp. 8:1-8:4, New York, NY, USA, 2013) proposed to interlock the code-words in the design that are generated during path traversing. However, even for wrong code-words, the functional mode is entered as an entry mode is followed by functional mode, hence inseparable. In a recent work (S. A. Islam and S. Katkoori, "High-Level Synthesis of Key Based Obfuscated RTL Datapaths," in 2018 ISQED, pages 407-412, March 2018), mobility of input operands during HLS was utilized to increase stealthiness of an RTL obfuscation. Although this technique introduces the obfuscation during the early design, it does not include the abuse case when an attacker may want to retrieve the key for a finite number of times.

Embodiments of the present disclosure are distinguishable from such prior techniques for at least the following reasons: (a) the present disclosure addresses the applied (both correct and incorrect) key propagation using comparators as stealthily as possible and simultaneously locks out the integrated circuit design for an incorrect number of attempts; and (b) does not require storage of the obfuscation key within the integrated circuit design to determine an incorrect attempt. The present disclosure also provides (in a subsequent section) the security evaluation of an RTL design against state-of-the-art side channel analysis to demonstrate the effectiveness of the disclosed concepts.

In considering a model of the type of threat that is to be addressed by an exemplary embodiment of the DLockout system, it is assumed an attacker has access to a locked netlist and an oracle black-box IC in order to attempt reverse engineering a correct key or unique identifier for the IC. It is also assumed that the IC design cannot be subjected to a sophisticated micro-probing attack. Previous published works made the similar assumptions for the threat model where the deobfuscation intent was effective either on a fully combinational or a sequential design at the gate-level. In addition, it is assumed that the attacker's objective is to reveal the key to enable the true functionality of the obfuscated RTL design. We also assume that the attacker does not have access to internal nets or terminals except primary input(s) and output(s). Under these assumptions, an attacker or adversary can apply any input sequence, analyze the input output behavior, and observe the output.

In response, an exemplary embodiment of a DLockout technique defends against Reverse Engineering (RE) by embedding comparators at the output of obfuscation logic or circuitry after regular key obfuscation is performed. FIG. 1 shows the overall design flow for implementing DLockout in a given key obfuscated RTL circuit design.

Here, the key verification or checking is performed using the comparators during startup of an integrated circuit. As shown, the design flow contains three major steps for key verification. First, given a key obfuscated RTL circuit design, the designer would incorporate a lockout module in accordance with embodiments of the present disclosure. Secondly, an attacker (user) during the post-synthesis stage of RTL in the supply chain would apply regular input(s) and key bit(s) of a particular length. As the extraction of the key is the most frequent target in any obfuscation scheme, one can apply brute-force or intelligent key inference techniques. A check between the allowed attempts and the number of times an incorrect key is applied will enable or disable the lockout module in an exemplary embodiment. Finally, when the unsuccessful key extraction trials end, the integrated circuit design is self-locked out in a nondestructive manner. After that, every execution of the IC design appears as a useless attempt. For successful recovery from an obfuscated and locked out IC design state, an authorized party (e.g., designer) can apply the correct key in accordance with embodiments of the present disclosure, as discussed further below.

To implement the lockout module in the RTL datapath, DLockout relies on the observation that the obfuscated RTL circuit is available after the designer performs scheduling, allocation, and binding according to a cost-speed trade-off during HLS. HLS provides an opportunity to reuse existing hardware resources for both figures of merits (power, performance, and area) and security reasons. During the early stage of design, the defender can place a multiplexer based key at suitable obfuscation points in an RTL datapath. In various embodiments, these obfuscating points are annotated with XORs to verify the applied key is correct for the successful execution of the IC design. These annotations may be followed by a counter circuit element to ensure that the number of the times the incorrect key can be applied does not exceed the designer specified threshold, thus (semi) blocking the brute-force approach. To support this capability, the datapath is augmented with a 3-bit, 2-input comparator. The annotated XORs' output determines the comparator output and introduces two variants (partial lockout and full lockout) of DLockout architecture. Even though it is possible for an attacker to find this regular structural pattern (MUX with XOR) inside an obfuscated RTL netlist, it is not possible to use this pattern to reveal the key. Moreover, attackers cannot bypass the correct key enforcement as the existing obfuscation logic or circuitry is used during both regular operation and key propagation for maximum flexibility during datapath synthesis.

Figure 2:
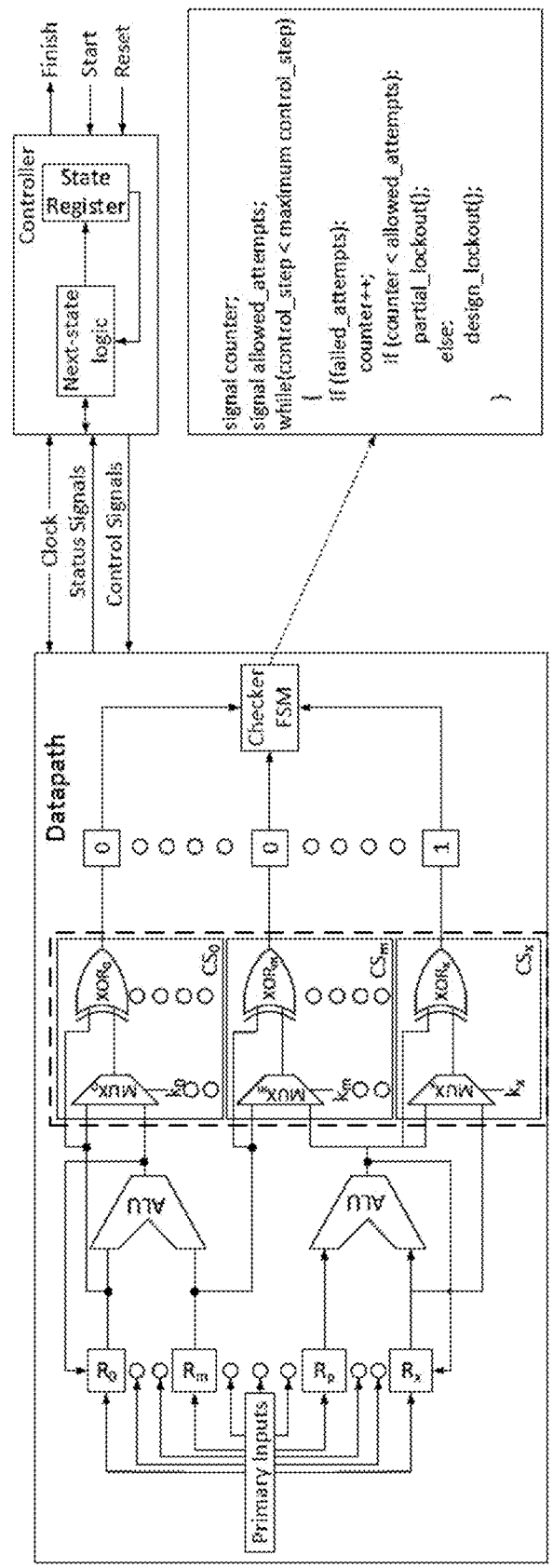
FIG. 2 is a diagram of a Glushkovian model of a key obfuscated RTL circuit design (datapath and controller) in accordance with embodiments of the present disclosure.

Next, FIG. 2 shows modifications to a Glushkovian model of a key obfuscated RTL datapath and controller elements, in accordance with embodiments of the present disclosure. Each obfuscation logic in the datapath is annotated with a 2-input XOR. The output (=0) of XOR determines that the correct key bit has been applied to a multiplexer selector input. The checker FSM would check all available XORs' output and increment the counter for any annotated XOR output signal being equal to '1'. When such number of '1's reach the threshold for incorrect attempts, DLockout will be active in place. Depending on the comparison between the counter value and allowed_attempt, two cases are implemented, namely, partial lockout and design lockout, in checker FSM shown at the right corner of FIG. 2. Partial lockout is active when a wrong key is applied to the obfuscation logic for the first time. Design_lockout( ) determines all allowed trials have been made. In both cases, an exception will be raised and the datapath will send out the output of the checker FSM to the controller. In the worst case, the checker FSM would remain active until the last control step when all the key bits before the last control step are correct. If the maximum wrong key attempts have been made in a control step, the checker FSM will be inactive for the remaining control step(s).

Figure 3:
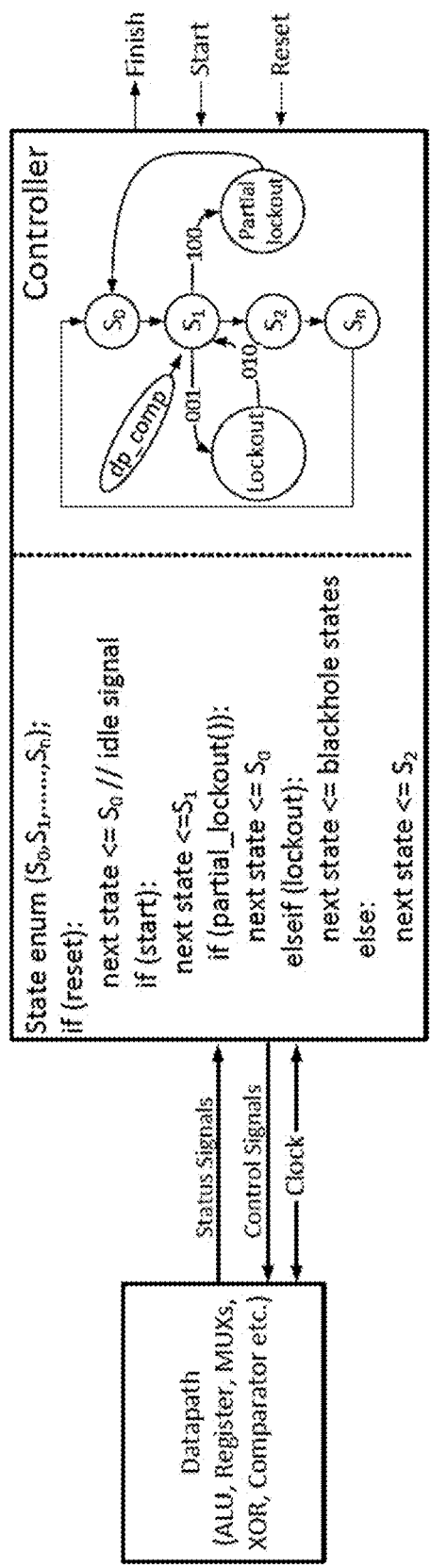
FIG. 3 is a diagram showing exemplary DLockout architecture within an RTL controller in accordance with embodiments of the present disclosure.

To implement an exemplary lockout scheme in the RTL controller, DLockout architecture is integrated into the RTL controller as shown in FIG. 3, in one embodiment. After performing static analysis of the controller, we modify parts of the state transitions for the controller. The modified controller makes it difficult for an attacker to correctly disassemble the state transitions, since the next state of the current state will change dynamically depending on the key bit and dp_comp signal from the obfuscated RTL datapath. So, the period in which the modified controller is the same as the original controller occurs when the design starts execution (i.e. Reset is high). After the primary input is latched into available registers and key checking at the first control step ($S_1$) is performed, the next state will be the truly original state ($S_2$) for correct key or it will revert to initial state ($S_0$) for partial lockout. In the design lockout phase, any true valid state is stripped from becoming the next state and the controller will enter into a permanent blackhole state as introduced. This design lockout phase adds more confusion to the attacker. Depending on the permissible area overhead, the number of blackhole states can either increase or decrease.

In various embodiments, DLockout is implemented in the controller at a state symbol level granularity. This is because the total number of states in the controller depends on the control steps during DFG (data flow graph) scheduling and remains intact throughout the execution of the design. Moreover, relative reordering of state symbols also depends on the status signals from the datapath. On the contrary, implementing DLockout at the state encoding level requires expensive algorithmic transformations. Such precise control over state encoding is not available in the current open source (e.g. LegUp) and commercial (e.g. Xilinx Vivado) HLS tool. For these reasons, we choose to apply DLockout at the state symbol level in one embodiment.

Figure 4:
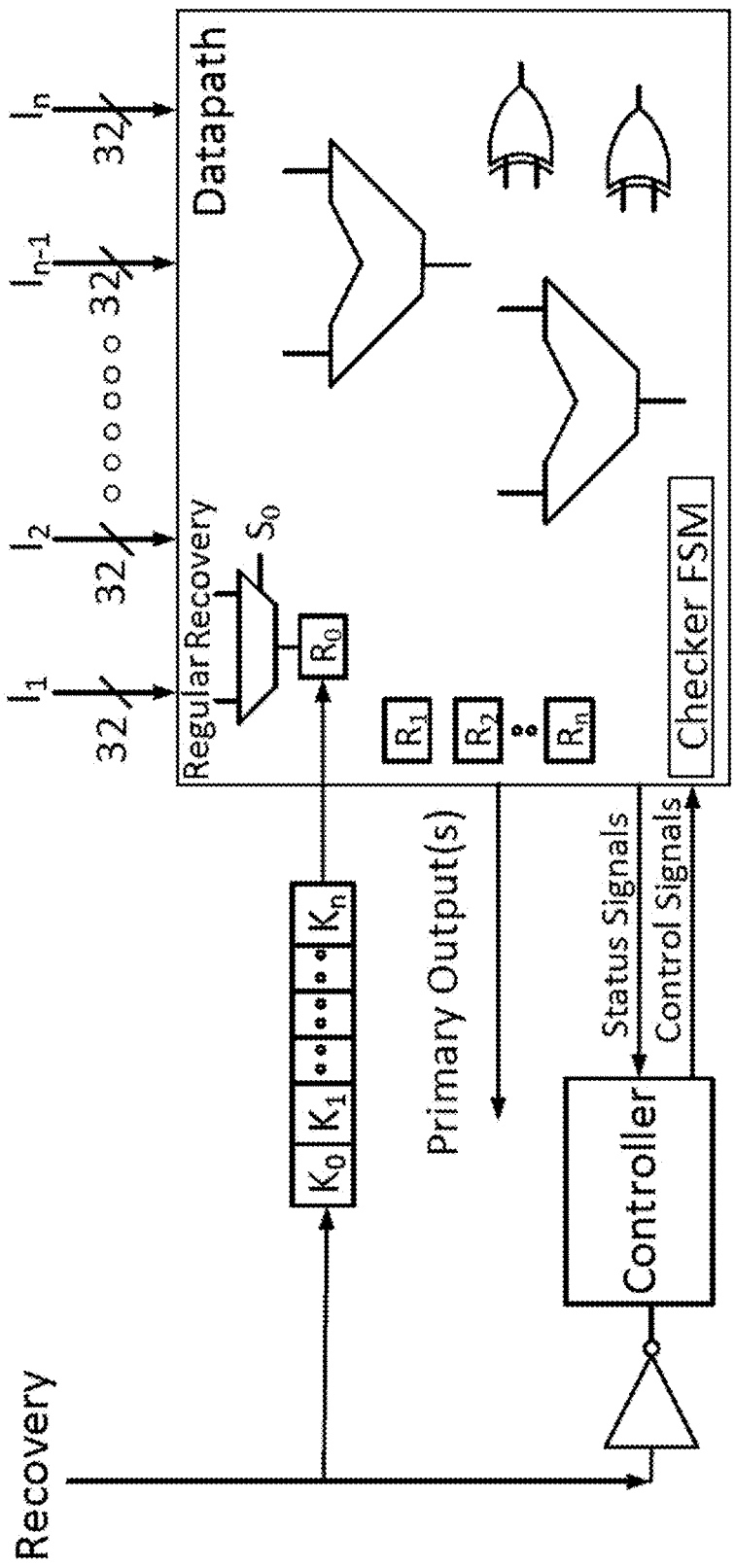
FIG. 4 is a diagram a recovery block in a DLockout framework in accordance with embodiments of the present disclosure.

A recovery mechanism is introduced as part of the DLockout framework in FIG. 4. In one embodiment, an additional input line (Recovery) is added to the key obfuscated RTL datapath and used to ensure a correct key flow once the IC design has been locked out. Recovery line is logic '0' during an IC design startup. Suppose that the lockout has been in place after several wrong key attempts. The designer can set the Recovery line to logic '1', and choose one of the reusable registers to feed the key to a key obfuscated datapath. During the time of recovery, the controller has been already set to a blackhole state and detached from the recovery line. After the correct key is latched into the register, the original obfuscated datapath will be restored for a valid input sequence and be semantically equivalent to a non-obfuscated datapath. To distinguish the regular input from the recovery key input, a 2-input MUX is added to the datapath block, in one embodiment. To this purpose, we do not add any register to load the valid key, in one embodiment. Hence, it is harder for an adversary to distinguish a valid key from ordinary inputs. Moreover, to obscure key loading, a user such as a defender can spread the recovery key through multiple primary inputs, which will result in a reduced ability to exploit the key. Unless the attacker knows the primary inputs being used for recovery key loading, the attacker will have to enumerate both the key and regular input through any of the primary input lines.

Figure 5A:
FIGS. 5A-5B are diagrams showing a modified datapath and controller of a Greatest Common Divisor (GCD) design in accordance with embodiments of the present disclosure.
Figure 5B:
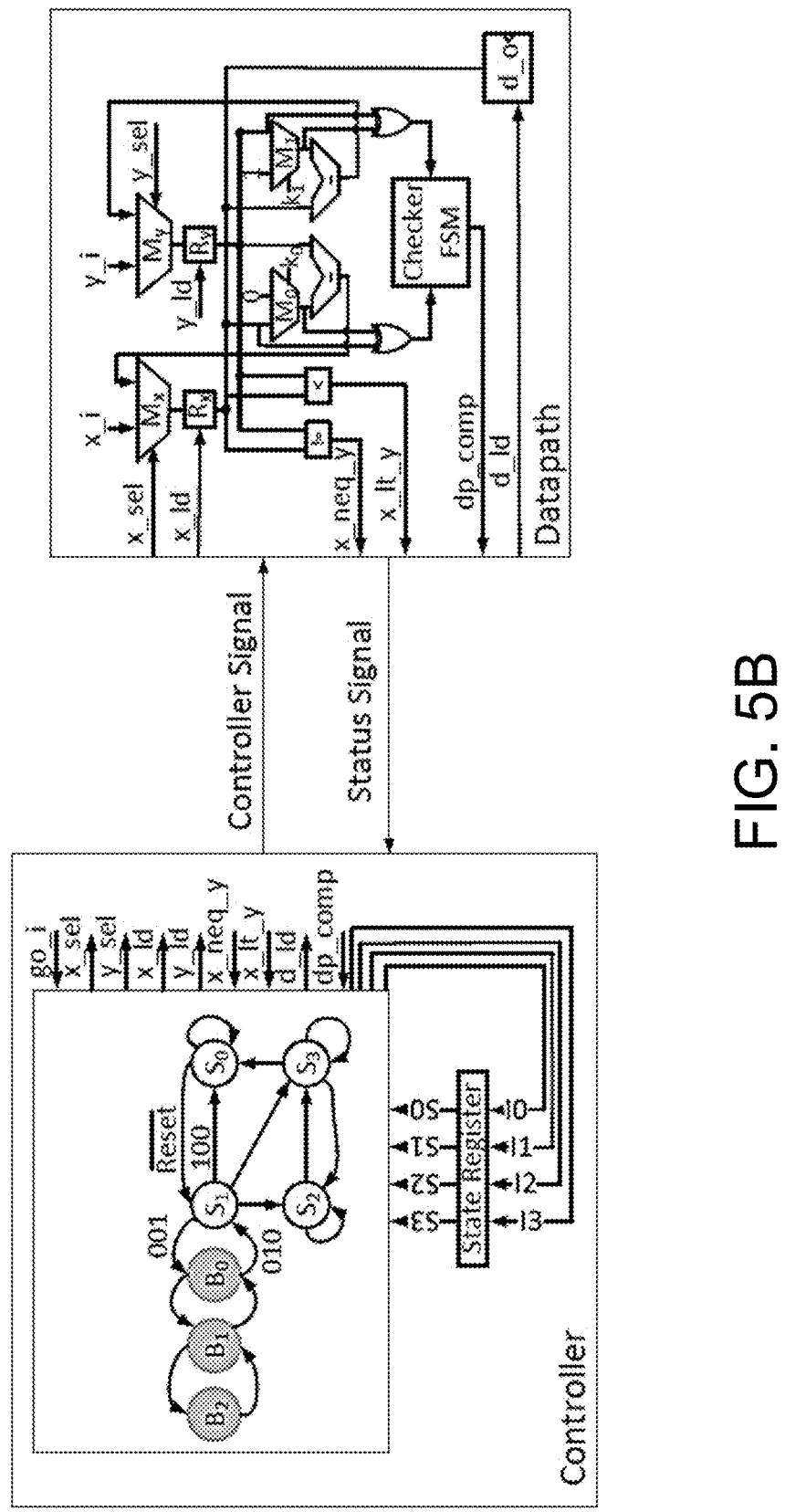

To further illustrate an exemplary concept of DLockout, consider the control intensive Greatest Common Divisor (GCD) program in FIG. 5A. DFG scheduling is performed within four (4) clock control steps, in which each operation initialization and completion time is confined to a single control step. One embodiment of an obfuscated RTL controller and datapath with DLockout is shown in FIG. 5B, in one embodiment. The figure shows additional hardware for obfuscation and lockout modules or elements including two multiplexers as obfuscation logic, two 2-input XORs, and a checker FSM in the datapath block. Correspondingly, three blackhole states, from $B_0$ to $B_2$, are embedded in the controller FSM. For simplicity of the diagram, the recovery hardware for GCD datapath is not illustrated in the figure.

For $(k_1, k_0)=(1, 0)$, the obfuscated GCD will be functionally equivalent as the deobfuscated GCD. For other key combinations, the output of XORs will be '1' implying that the checking through XORs has been unsuccessful. Upon receiving the XORs output as '1' for any of the three incorrect key combinations, the checker FSM will be active. The output of checker FSM, dp_comp will determine the next state of $S_1$. State ($S_0$) will be encountered for the partial lockout and new state entries ($B_0$ to $B_n$) will be active for design lockout. In this case, the recovery logic would be activated if requested. During recovery, all checks through XORs will be successful and checker FSM would set dp_comp to 010. The controller then comes out of any blackhole state (from $B_0$ to $B_n$) and enters into the legitimate state, $S_1$ and continues regular execution.

Figure 6:
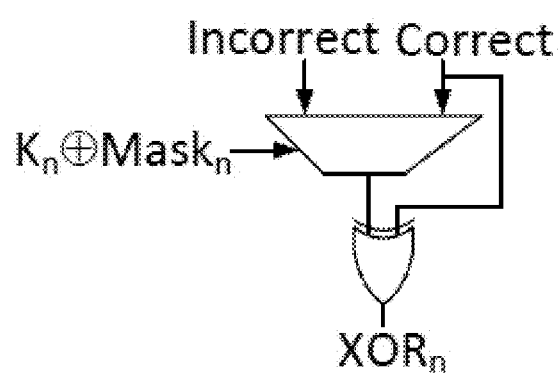
FIG. 6 is a diagram showing masked obfuscation logic with a comparator in accordance with the present disclosure.

In this next section, the present disclosure provides a qualitative analysis of DLockout against three state-of-the-art of side channel attacks (SCA) and an SAT attack. The present disclosure also mentions the success probability of key extraction for a given number of trials. In a Power Analysis (PA) Attack, both SPA (Simple Power Analysis) and DPA (Differential Power Analysis) have been proven to recover a crypto key using multiple power traces. For an exemplary DLockout architecture, assume the attacker develops a power model of obfuscation logic using parameters such as a number of muxes and comparators and their locations and derives the partial key before lockout occurs. Then, to de-correlate power traces with the applied key, assume a random mask bit is XORed with the key bit to implement key-independent MUX output as shown in FIG. 6. In other words, the MUX output exhibits the same probability distribution independent of the key and mask bit. The XOR output is also uncorrelated to the individual key and mask bit as shown in Table I.

TABLE I

Truth Table of Masked Obfuscation logic

| $K_n$ | $Mask_n$ | $MUX_n$ | $XOR_n$ |
|---|---|---|---|
| 0 | 0 | Correct | 0 |
| 0 | 1 | Incorrect | 1 |
| 1 | 0 | Incorrect | 1 |
| 1 | 1 | Correct | 0 |

For a Fault Attack (FA), in an exemplary DLockout, the comparators' output exhibits the highest sensitivity to faulty operation as a deliberate fault injection would disable applied key propagation from MUX to XOR. To detect a stuck-at-fault (SAF) attack, in one embodiment, an Error Detection Unit (EDU) is incorporated in the datapath that checks the output of MUXs and XORs, as shown in FIG. 6. If it is assumed that the defender tags a single check bit to each MUX input, Table II shows the operation of the EDU. Even with the incorrect key, a lockout architecture is susceptible to FA when the SAF at XOR is 0.

TABLE II

Operation of Error Detection Unit (EDU)

| SAF at XOR | Multiplexer Output | XOR Expected Output | EDU Output | Comment |
|---|---|---|---|---|
| 0 | 0 (Correct) | 0 | 0 | Ineffective fault & lockout-free |
| 0 | 1 (Incorrect) | 1 | 1 | Fault detected & lockout-free |
| 1 | 0 (Correct) | 0 | 1 | Fault detected & lockout |
| 1 | 1 (Incorrect) | 1 | 0 | Ineffective fault & lockout |

Next, for a successful timing attack (TA), the attacker would determine the execution time of expensive computations with sufficient knowledge of obfuscating transformation. In one embodiment of an exemplary DLockout scheme, the key obfuscation logic (MUX) includes two constant multiplications and one addition. The internal transition time (1.10 ps for SAED 90 nm) of MUX is negligible compared to the design frequency of operation (10 ns). Moreover, the single-bit operation of MUX is independent of its input operand size.

In a traditional logic locking attack model, an SAT attack (Satisfiability Attack) has been quite effective to deobfuscate either a combinational or a sequential design at the gate-level. In an exemplary DLockout approach, however, the key pruning technique for an SAT attack would be infeasible as the key is embedded in the register of datapath in a RTL design, in various embodiments.

Regarding key extraction probability, within the finite attempts allowed by the DLockout, the attacker may want to extract a partial key bit sequence. Let n denote the total number of obfuscation logic and m denote the key size. The probability of mapping a key from $2^m$ combinations to n! permutations of MUXs is given by:

$$P(m, n) = \frac{1}{n! * 2^m} \quad (1)$$

If the total number of allowed attempts is X, the probability of guessing the correct key bit at Kth attempt:

$$f(K, X, P(m, n)) = \binom{X}{K} * P(m, n) * (1 - P(m, n)); K \leq X \quad (2)$$

For finite control steps and larger key size, DLockout provides a negligible probability that a key bit can be leaked. Moreover, the output of XOR depends on one of the MUX inputs, hence knowing the XOR output does not lead to the leakage of the key.

Given an obfuscated RTL design, in various embodiments, a robust design lockout (DLockout) technique. Is implemented in an (obfuscated) RTL datapath and controller, followed by a recovery technique from design lockout. During the early stage of design, a defender can place multiplexer-based key at suitable obfuscation points in an RTL datapath. In various embodiments, XORs are inserted at these obfuscating points to check the key for successful execution of the design. These XORs are followed by a counter to count the number of incorrect attempts. If the count exceeds the designer specified threshold, then the design is blocked from further execution. To ensure that an attacker would not utilize "cold-reboot" to reset the counter value, the counter value is stored in a non-volatile storage, in one embodiment. To support this capability, the datapath can be augmented with a 2-input 3-bit comparator. The annotated XORs' output determines the comparator output and introduces two variants (partial lockout and full lockout) of DLockout architecture. Even though it is possible for an attacker to find this regular structural pattern (multiplexer with XOR) inside an obfuscated RTL netlist, it is not possible to use this pattern to reveal the key. Existing obfuscation logic may be reused during both regular operation and key propagation for maximum flexibility and key interference during datapath synthesis. Hence, an attacker cannot bypass the correct key enforcement mechanism.

Figure 7:
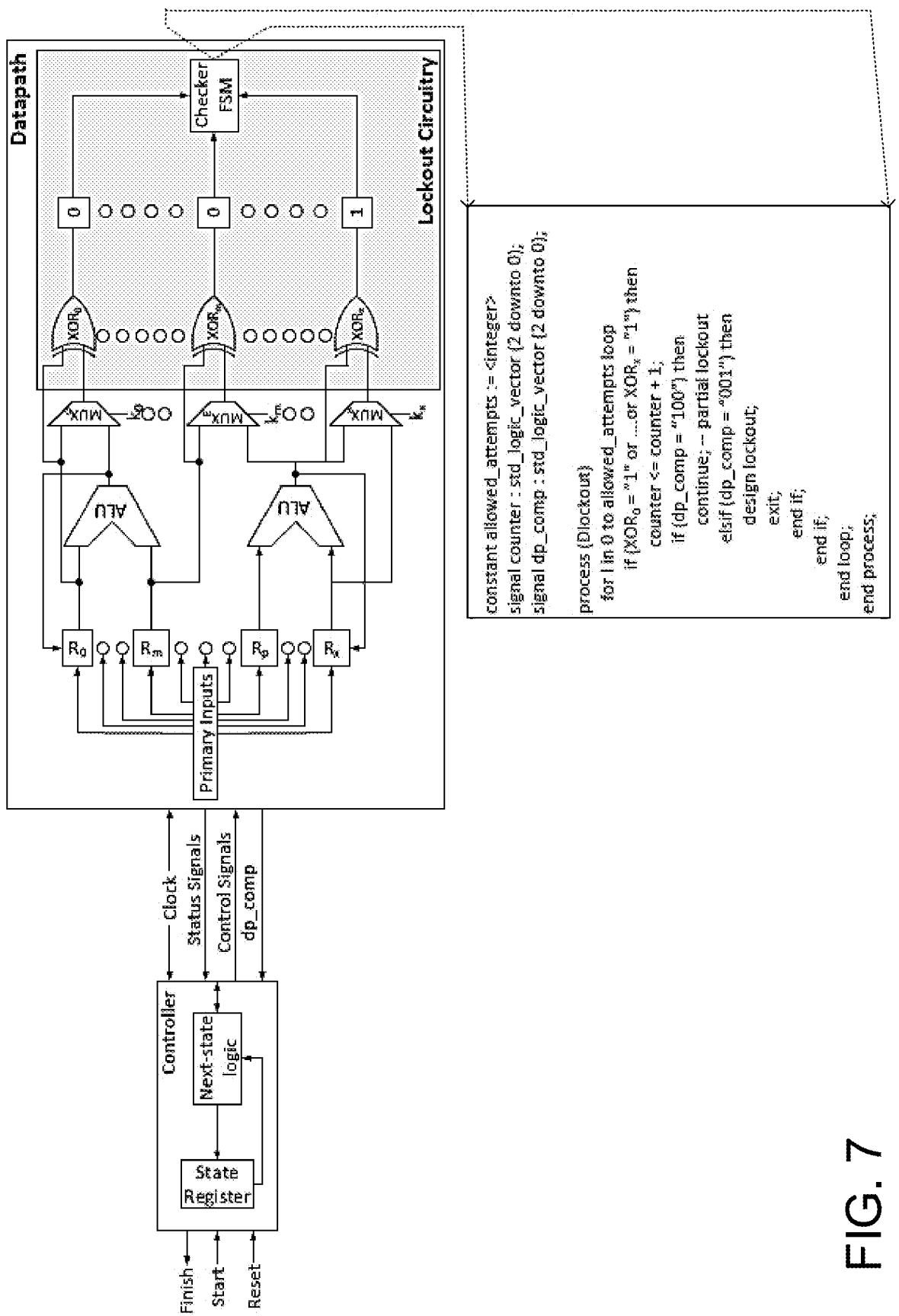
FIG. 7 shows a Glushkovian model of key obfuscated RTL design with design lockout circuitry in accordance with embodiments of the present disclosure.

FIG. 7 shows the modifications to the Glushkovian model of an obfuscated RTL datapath and controller, in accordance with an embodiment of the present disclosure. Each obfuscation multiplexor in the datapath is augmented with a 2-input XOR. The output (=0) of XOR determines that the correct key-bit has been applied to a multiplexer selector input. The checker FSM checks all XORs' output and increments the counter value for any XOR output signal being equal to '1'. When the count exceeds the threshold on number of incorrect attempts, DLockout is activated. Depending on the comparison between counter and allowed_attempt, two cases are implemented, namely, par-tial_lockout and design_lockout, in checker FSM shown in the right side of FIG. 7. The design will be in a Partial_lockout mode when a wrong key in applied. Design_lockout implies that an attacker has tried all allowable attempts. In both cases, an exception will be raised and datapath will send out the output of the checker FSM (dp_comp) to the controller.

Figure 8:
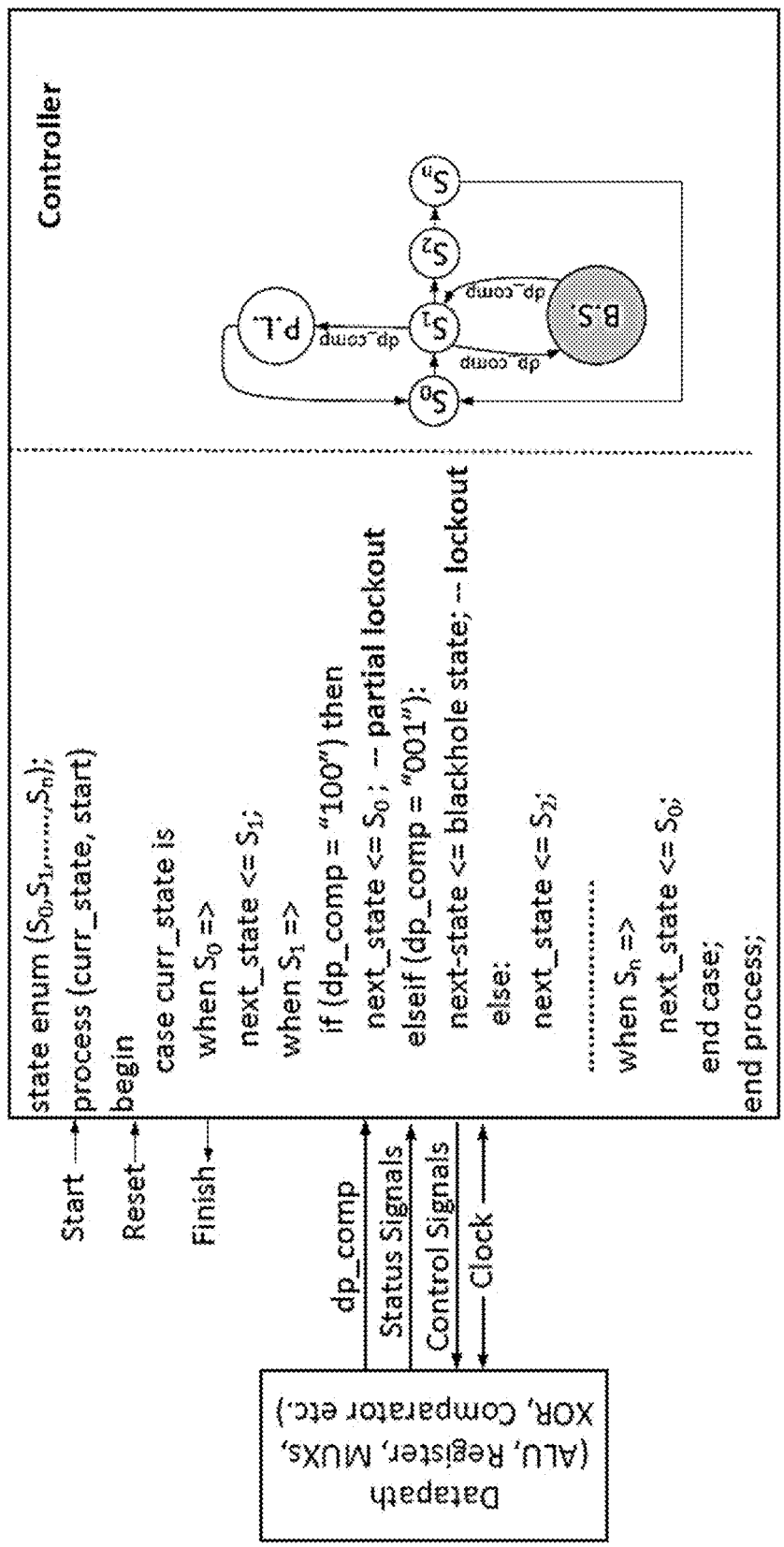
FIG. 8 is a diagram of an exemplary RTL controller with DLockout architecture in accordance with embodiments of the present disclosure.

In various embodiments, the DLockout mechanism is integrated into the RTL controller, as shown in FIG. 8. After the primary inputs are latched, key check is performed in the first state (S1). If the key is incorrect, the machine gets into a partial lockout state. The machine will be in partial lockout state as long as the incorrect attempts are less than the threshold. When the threshold is met, the machine enters into a design lockout state, which is a permanent blackhole state. This mechanism adds more confusion to the attacker. Depending on the permissible area overhead, the number of blackhole states can be high or low. In various embodiments, DLockout is implemented in the behavioral controller of the design.

Figure 9:
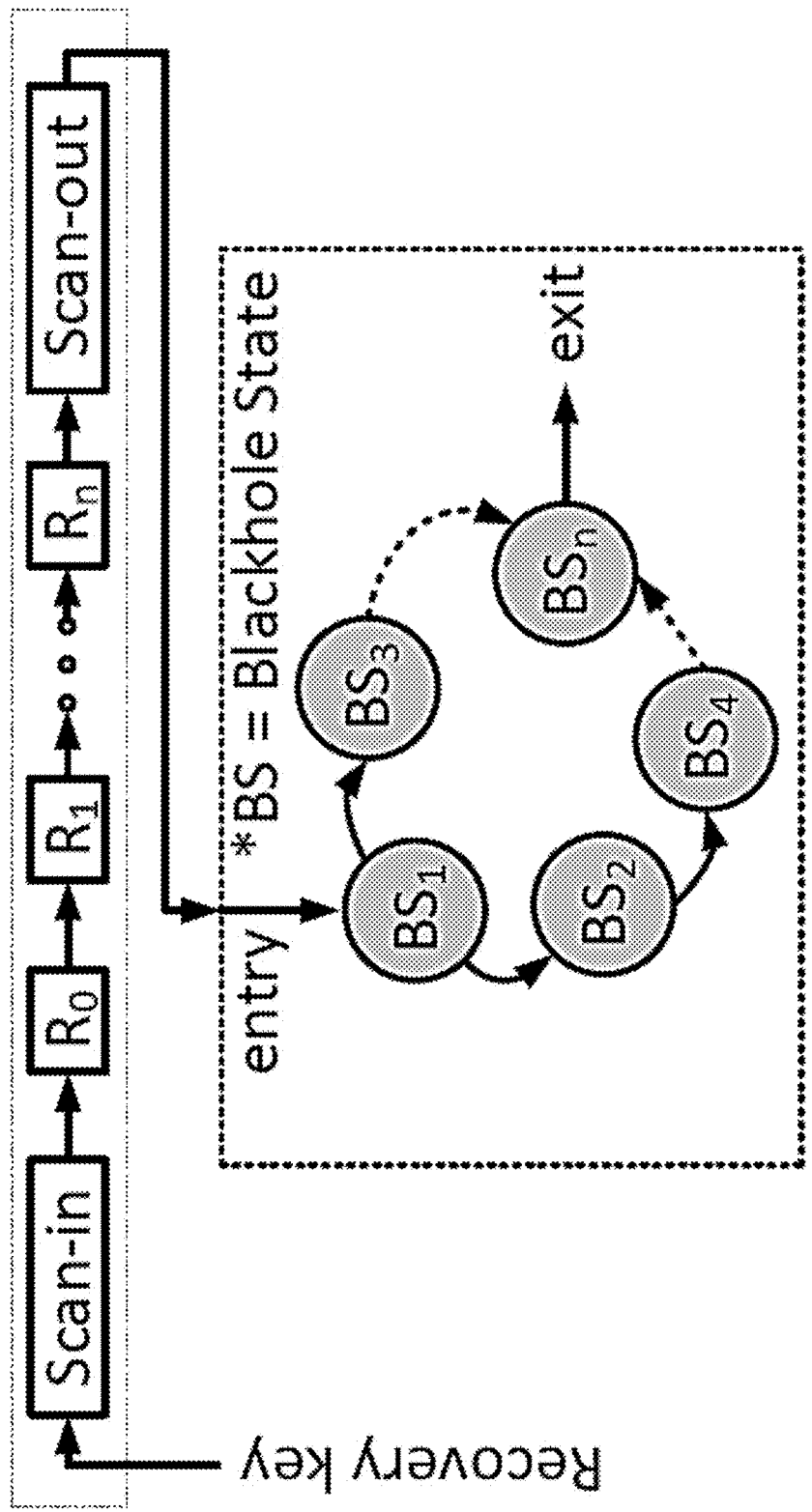
FIG. 9 shows a schematic of an exemplary recovery mechanism using scan test registers in accordance with embodiments of the present disclosure.
Figure 10A:
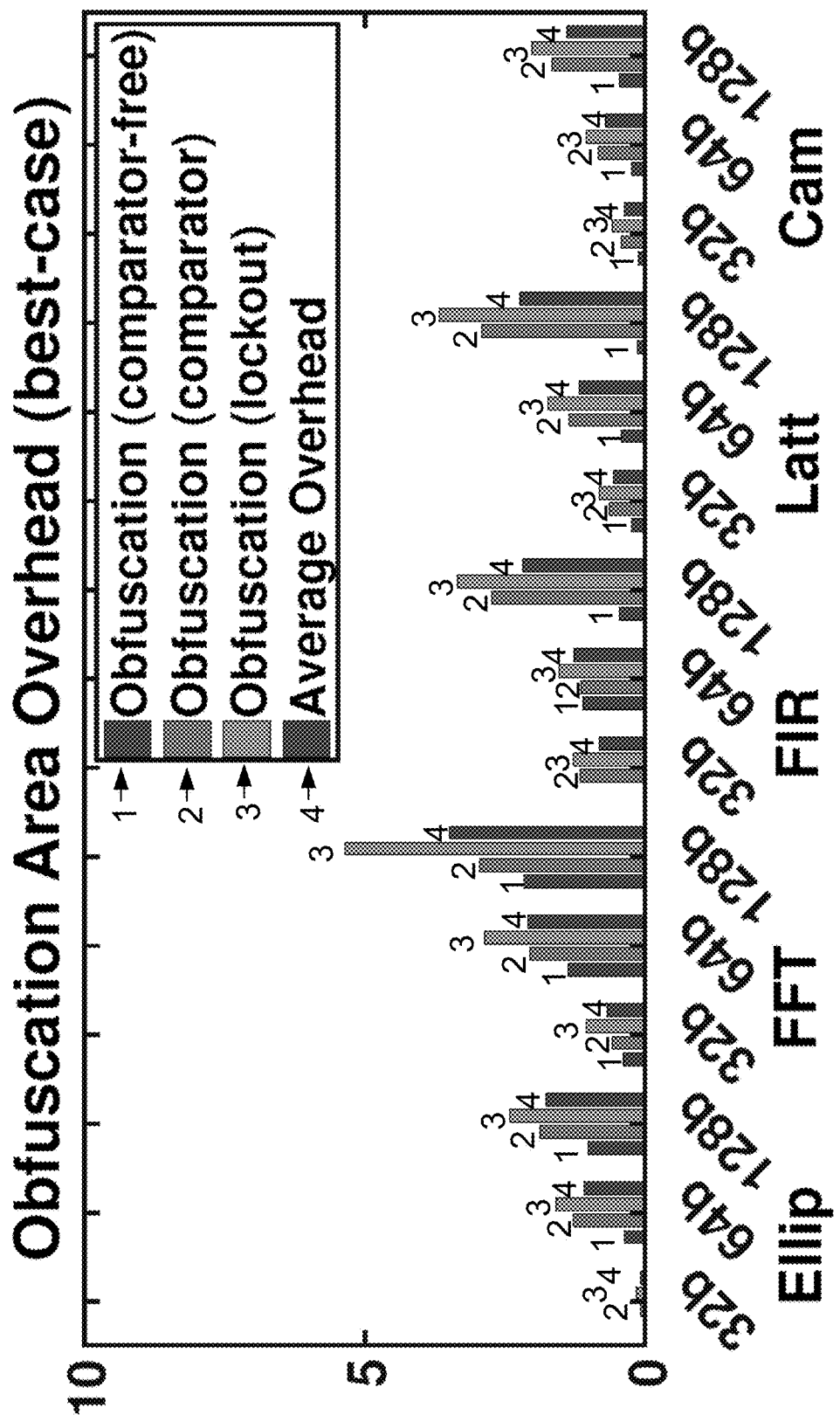
FIGS. 10A-10L are diagrams showing a comparison of benchmark parameters for different key lengths in three design corners in accordance with embodiments of the present disclosure.
Figure 10B:
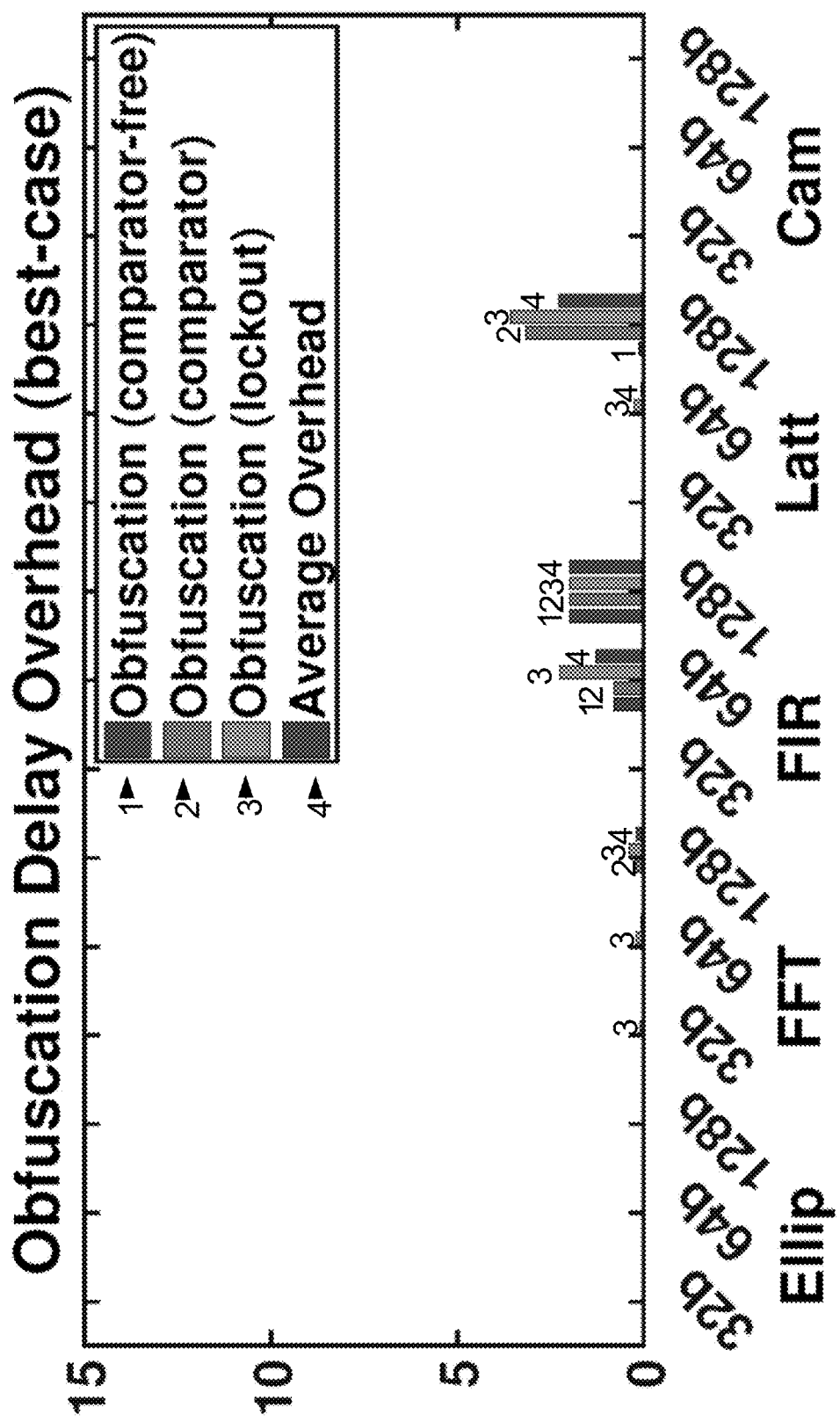
Figure 10C:
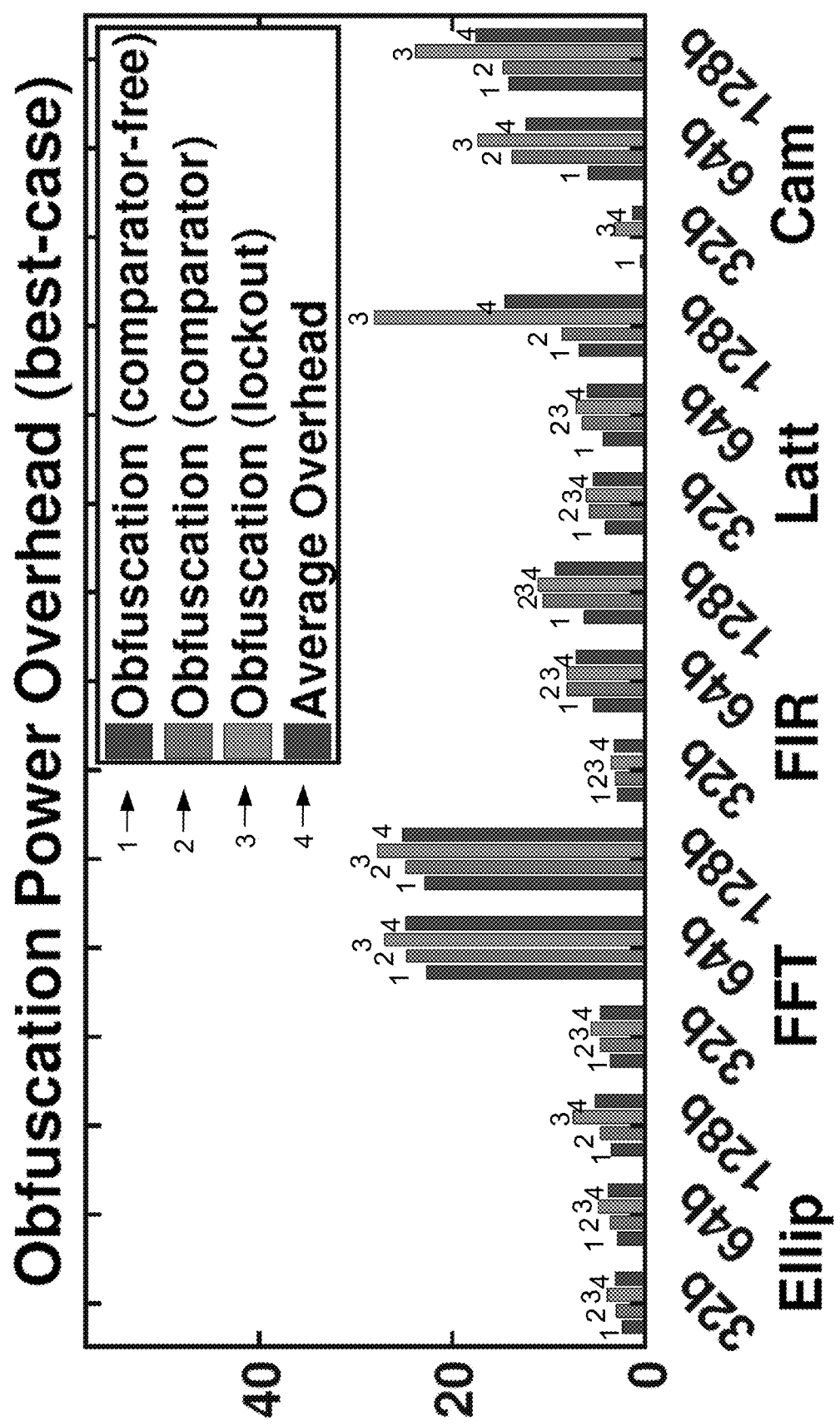
Figure 10D:
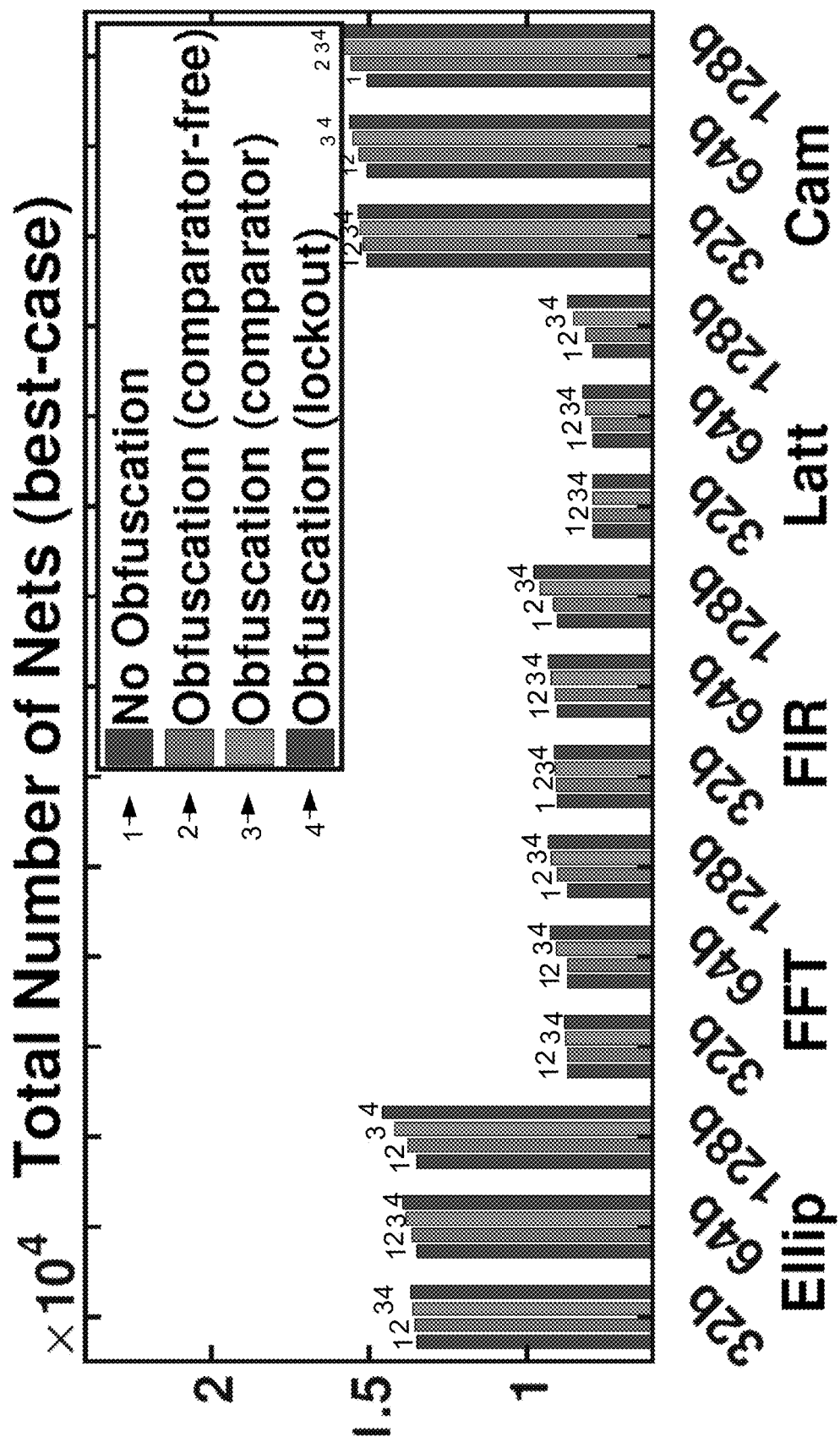
Figure 10E:
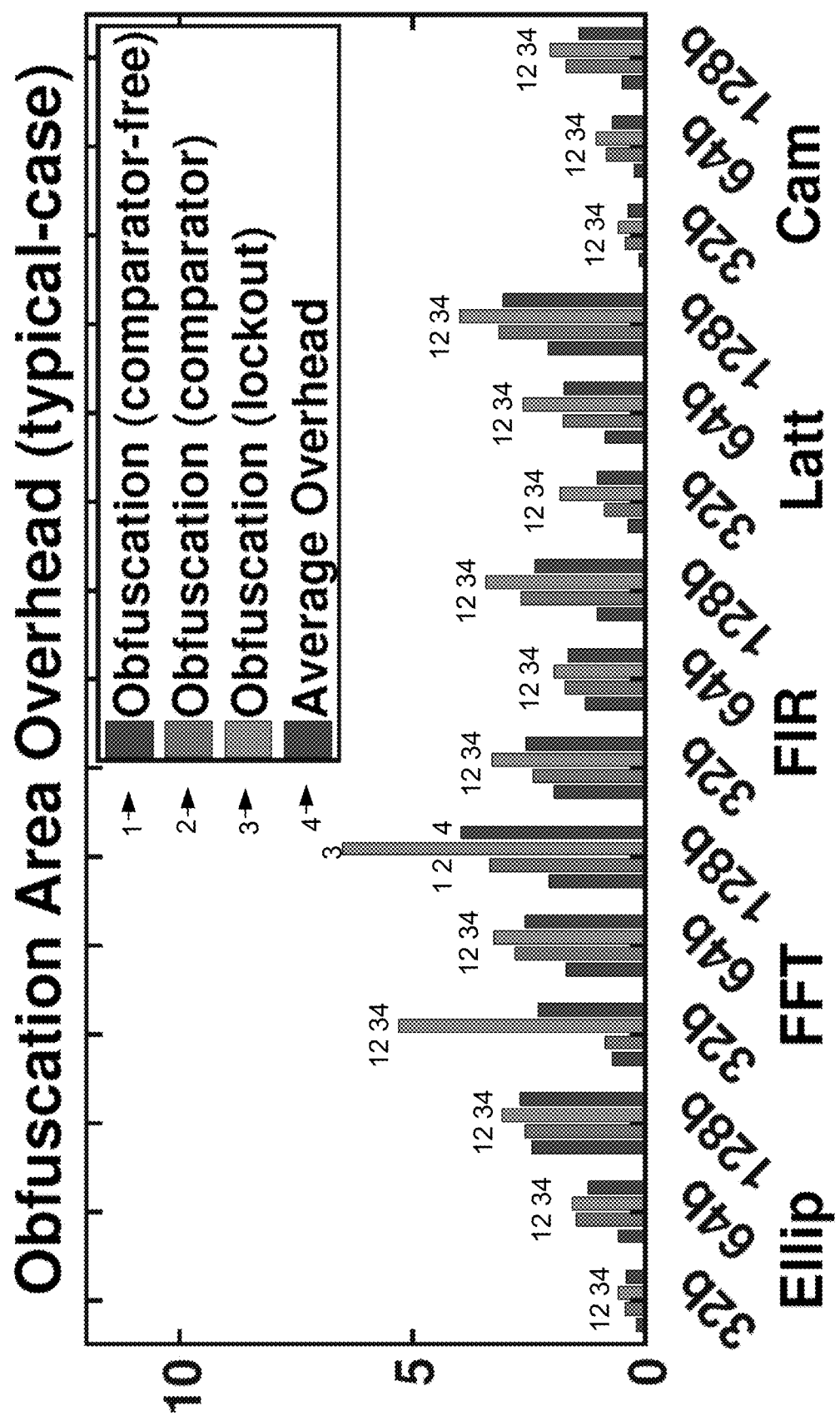
Figure 10F:
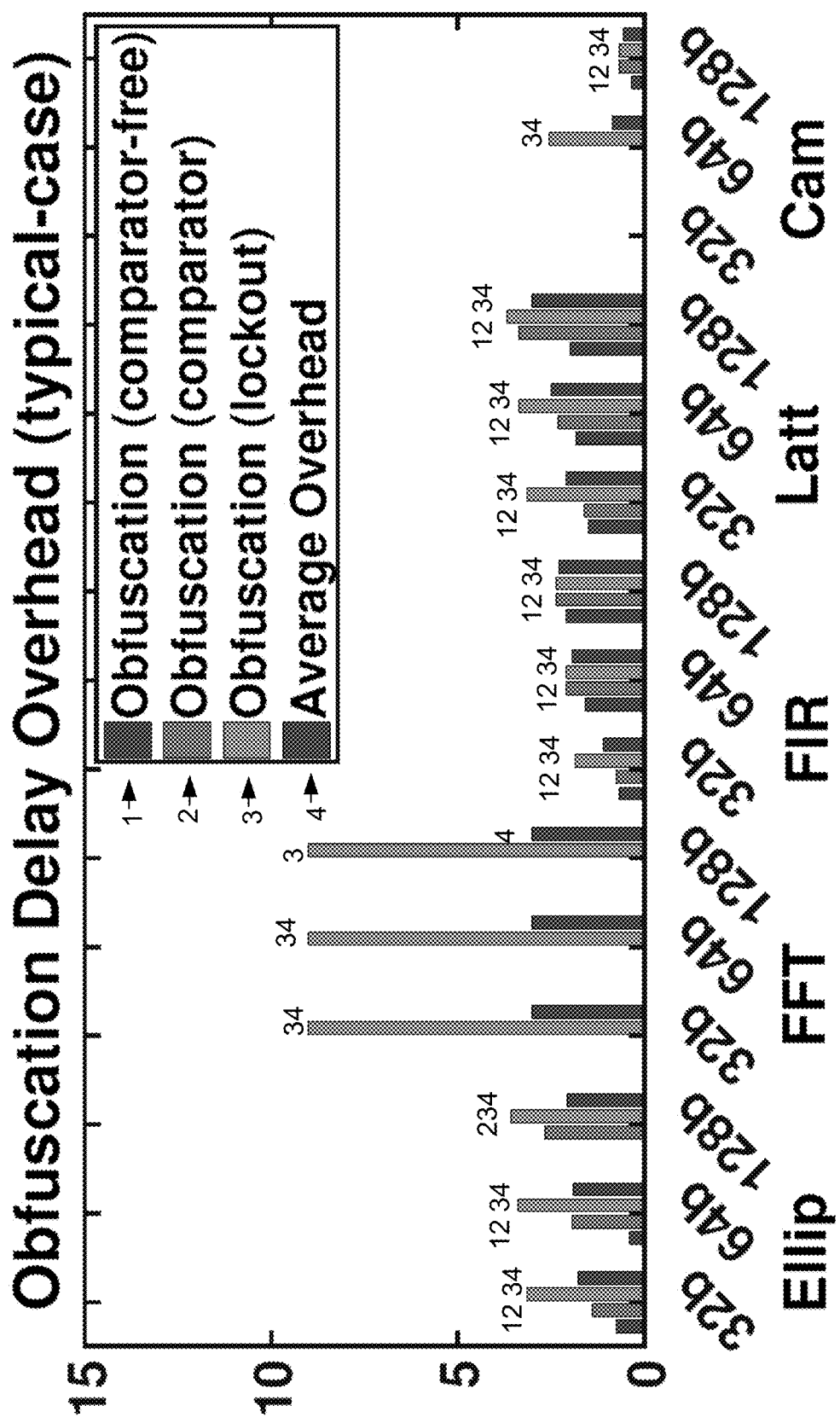
Figure 10G:
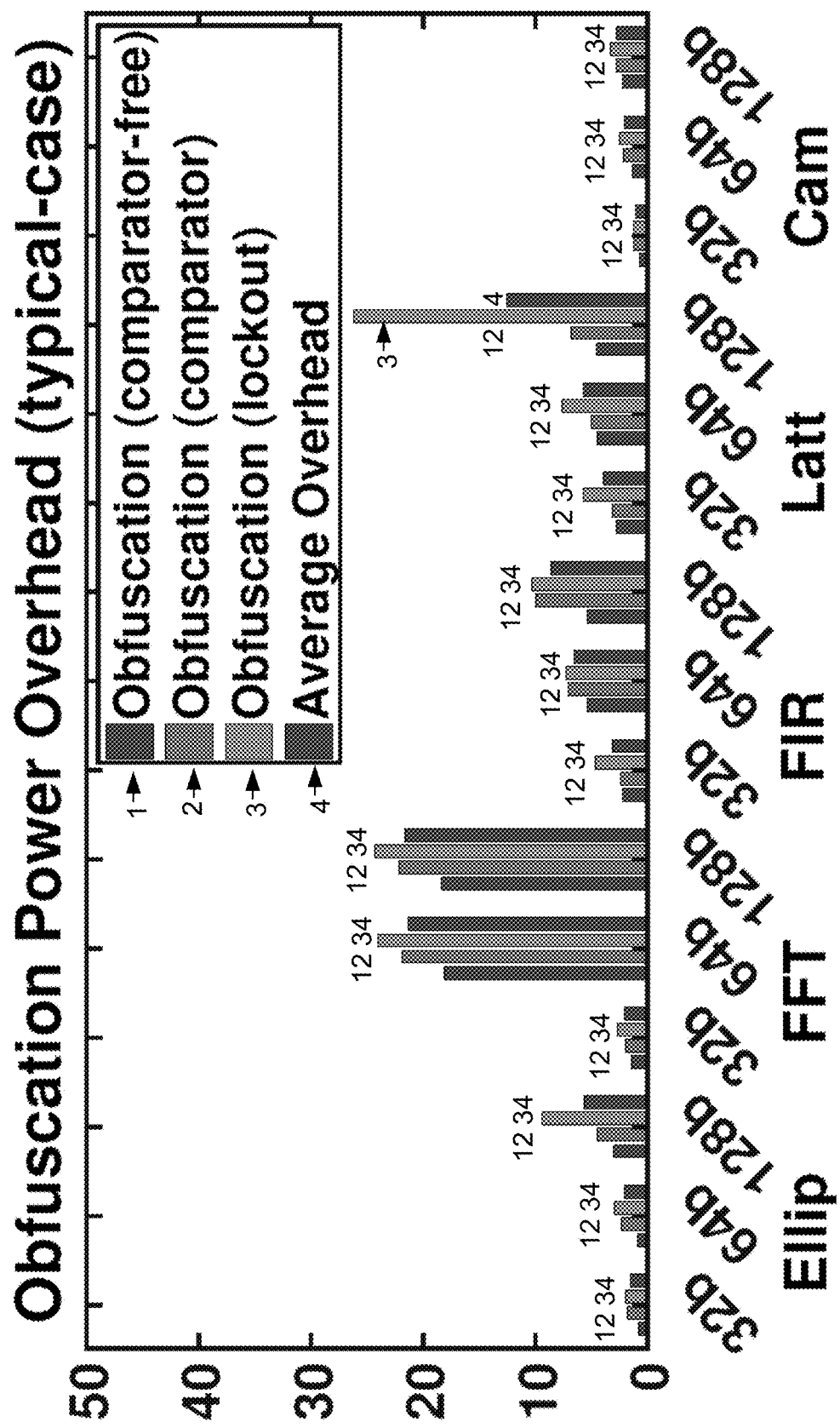
Figure 10H:
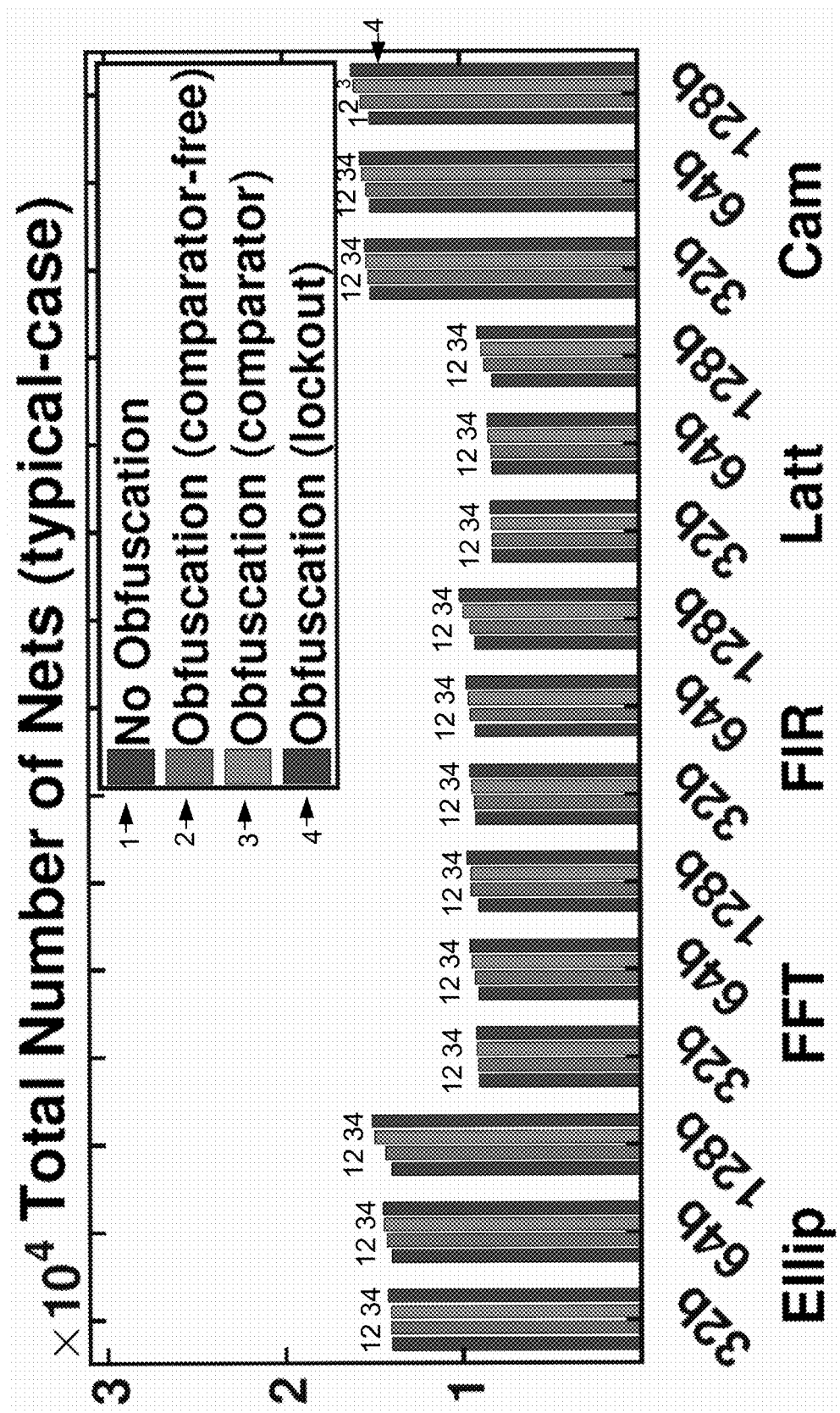
Figure 10I:
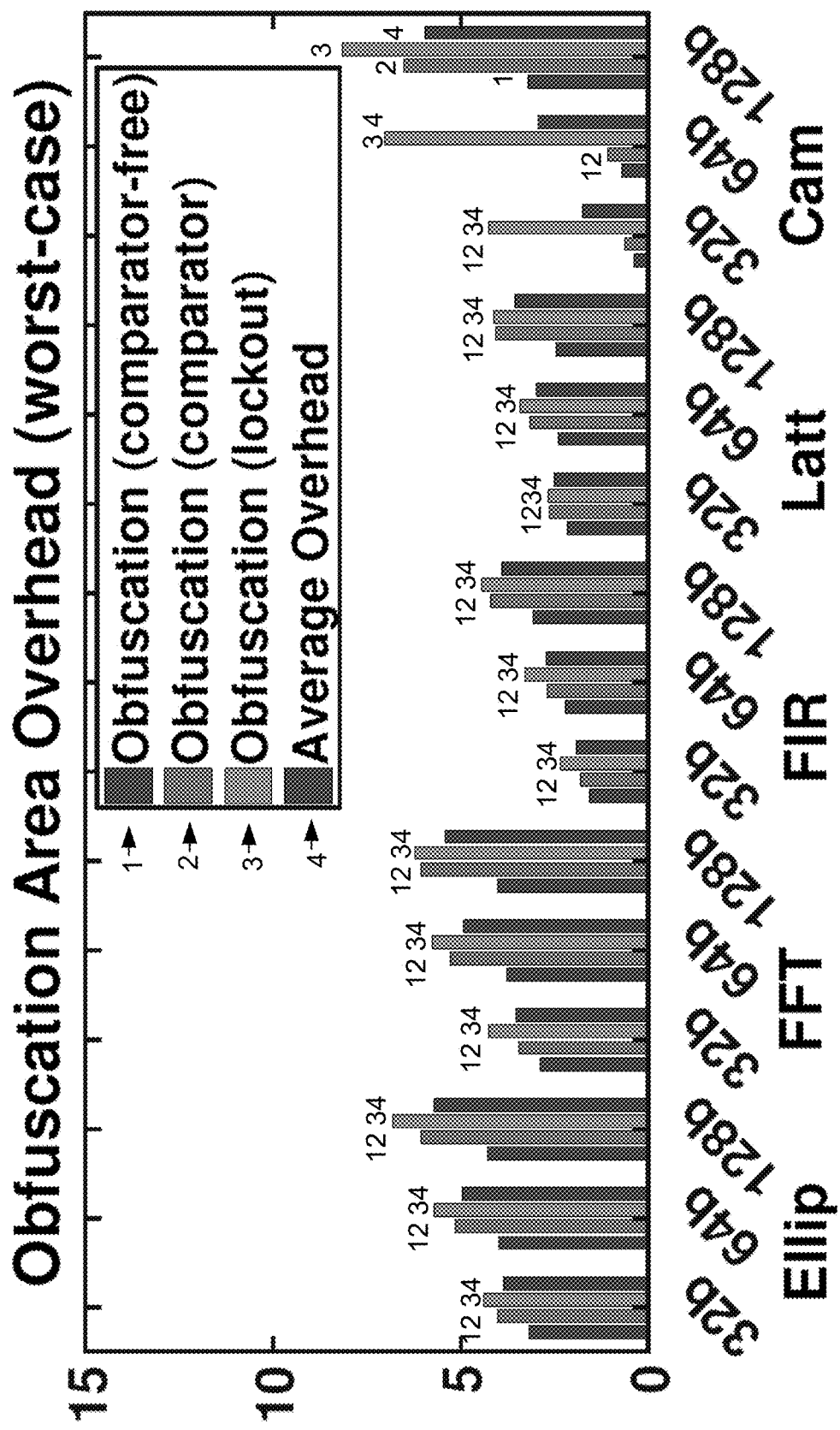
Figure 10J:
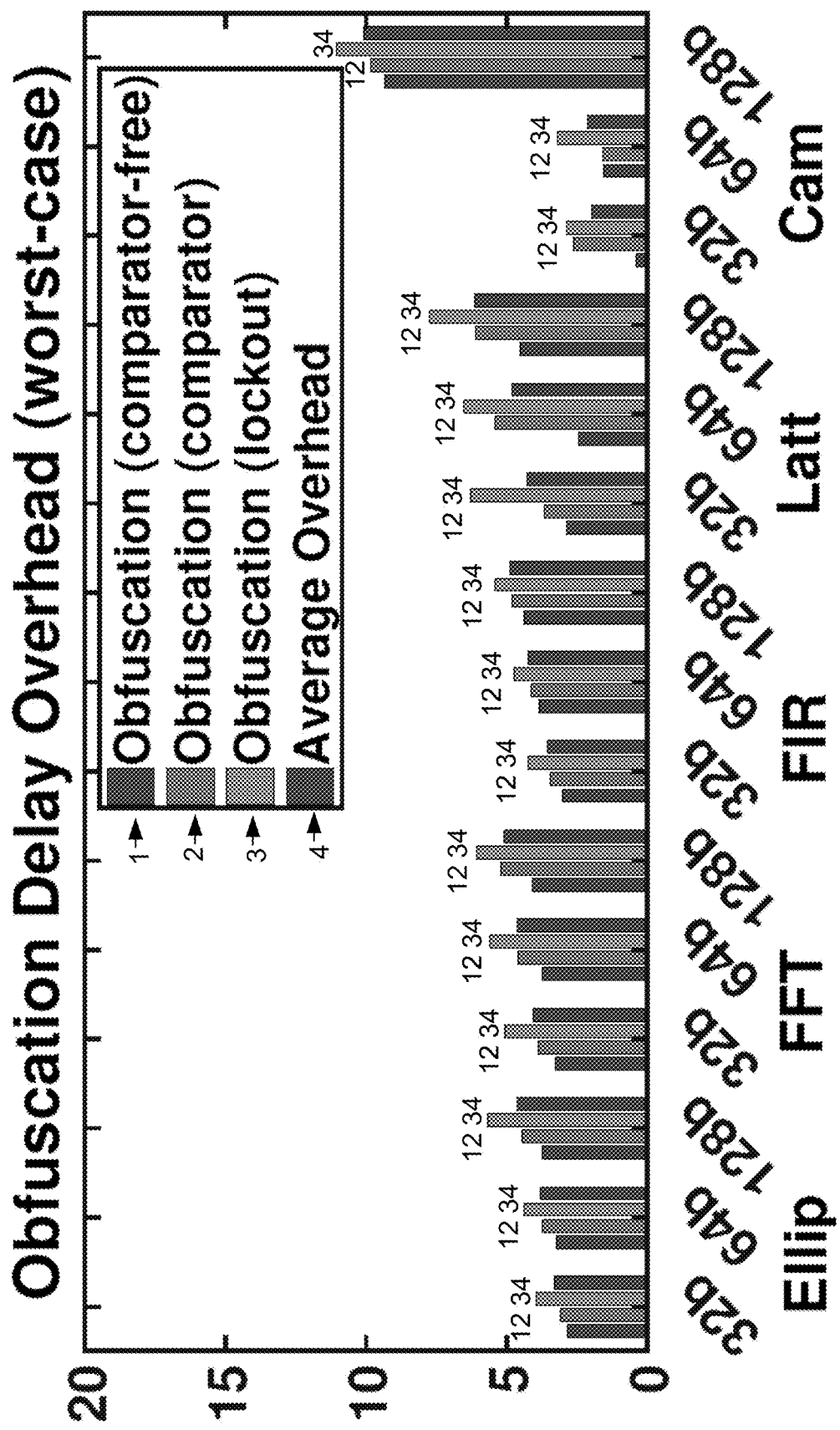
Figure 10K:
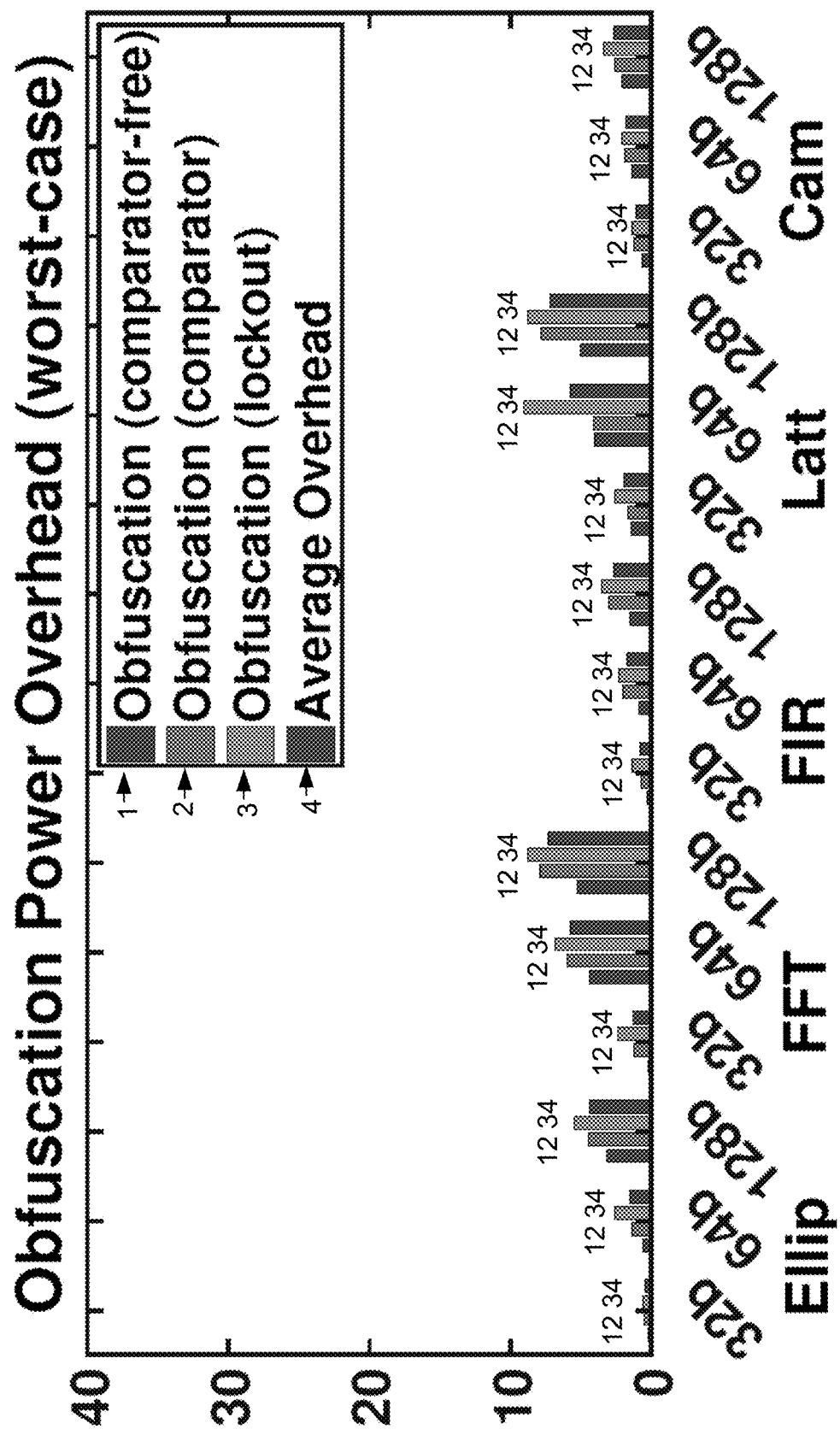
Figure 10L:
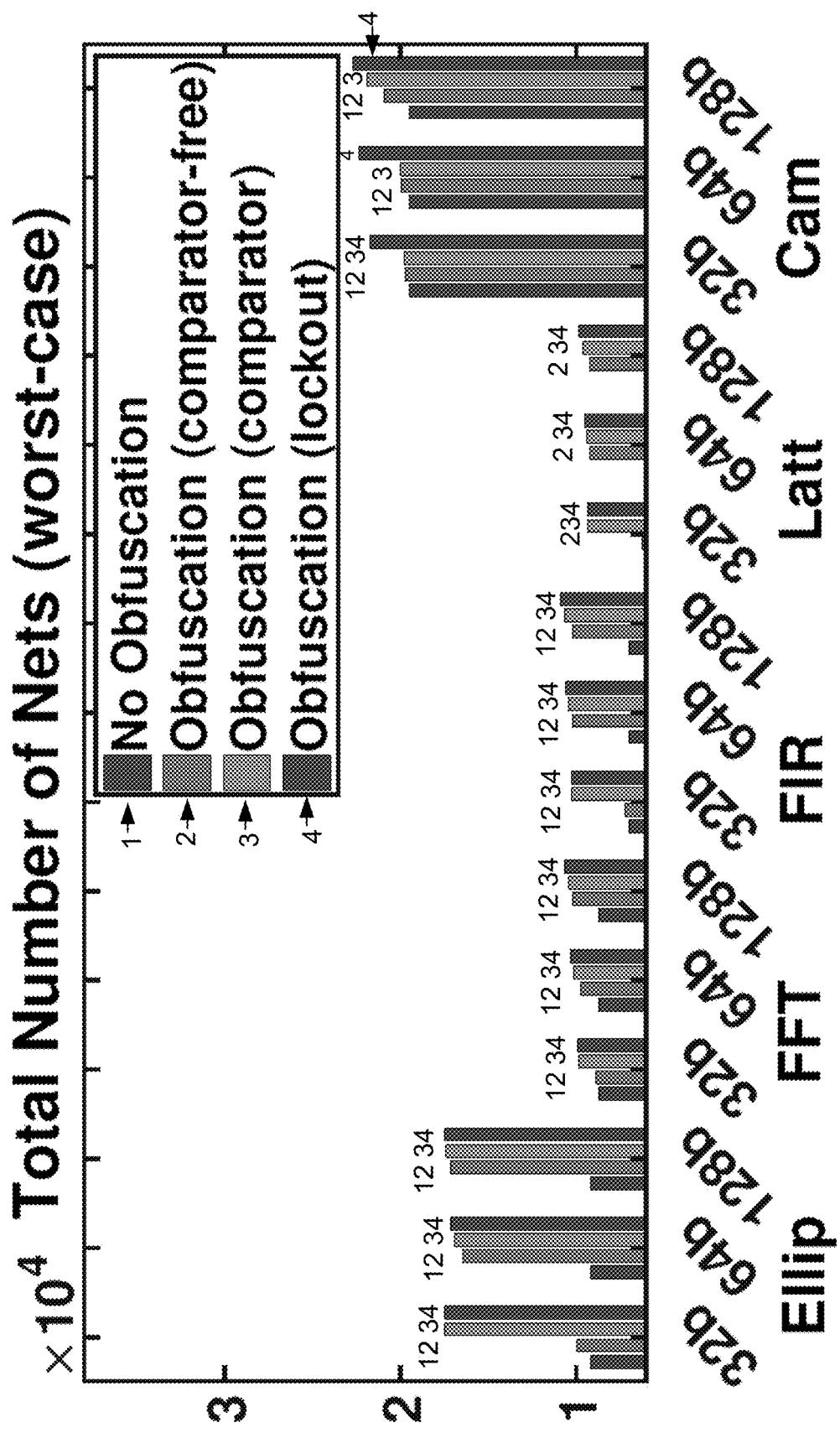

In various embodiments, a recovery mechanism using scan test registers is implemented in the design, as illustrated in FIG. 9. A secure scan-chain would provide the security requirements along with the test procedure to generate test patterns and analyze test responses. In one embodiment, the scan-chain internal structure is protected during test and recovery mode. To recover from the design lockout state, a recovery key is serially loaded into the scan chain. Blackhole states in FIG. 9 form a directed graph. Each edge in this directed graph is encoded with the key-bit(s). Hence, a unique path containing variable blackhole states would be traversed during recovery. The depth of scan-chain can be determined as follows:

$$\#Depth\_scan\_chain = \frac{|Key|}{Storage\_of\_scan\_register} \quad (3)$$

Similarly, we can determine the number of blackhole states as follows:

$$\#blackhole\_nodes = \left(bits\_per\_edge * \frac{edges\_traversed}{2}\right) + 1 \quad (4)$$

To evaluate the performance of DLockout, gate-level simulations were preformed using a Synopsys Design Compiler in SAED 90 nm technology for four datapath intensive benchmarks (Elliptic, FFT, FIR, and Lattice) and one crypto core (Camellia). Elliptic is a fifth-order wave filter, FFT is an 8 point Fast Fourier Transform algorithm, FIR is a Finite Impulse Response filter with a 5 delay unit, and Lattice is a single input linear prediction filter. Camellia is a block cipher core. For a clock frequency of 10 ns, each design was synthesized in three scenarios: regular obfuscation (comparator-free), obfuscation with comparator only, and obfuscation with DLockout. For each case, the individual overhead was measured for three design corners (best, typical, and worst) under three different key length as shown in FIGS. 10A-10L. With increasing key length, a similar trend in overhead was observed. Across all benchmarks, an average area overhead was seen to increase from 1.50% to 3.78% as we moved from best-case to worst-case. The average delay overhead decreased from 3.99% to 0.99% for worst-case and best-case respectively. However, the reverse trend was observed for average power overhead as it decreased from 6.86% to 5.58% from best-case to worst-case.

From experimental testing, it was seen that the best-case and typical-case design corner allow for reduced area and delay overhead while see a minimal increase in power overhead for the worst-case design corner. This is because, during worst-case, the HLS synthesis tool inserts additional buffers and inverters to meet the timing requirement. On the contrary, during best- and typical-case, the HLS synthesis tool uses the same module for multiple times to propagate all available input vectors, thus increasing switching activity on internal nets. One can see that along with the increase in key length, the number of nets increases as well in FIGS. 10D, 10H, and 10L. Hence, the probability of finding the nets responsible for key propagation is small for the higher key length.7

In the present disclosure, embodiments of DLockout circuitry are described, that can provide an add-on to an existing key obfuscated RTL IC design to increase the difficulty in reverse engineering the IC. Once the number of key recovery attempts exceeds a preset threshold, operation of the IC design is self-locked out to provide a strong security guarantee against brute force attacks. As a result, any future execution of the IC design requires a disclosed recovery block or mechanism to be activated in-place. The effects of DLockout architecture on design parameters are minimal and modifications on DLockout architecture are presented against side channel attacks.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the principles of the disclosure. All such modifications and variations are intended to be included herein within the scope of this disclosure and protected by the following claims.

The invention claimed is:

1. An integrated circuit design lockout system comprising:
   an integrated circuit;
   a key obfuscated circuit embedded with the integrated circuit, the key obfuscated circuit comprising one or more multiplexers, wherein the key obfuscated circuit is configured to verify that a user provides a valid key for the integrated circuit before the user is allowed to operate the integrated circuit; and
   a lockout circuit embedded with the key obfuscated circuit, wherein the lockout circuit is configured to allow for a threshold number of failed attempts for the user to provide the valid key before the lockout circuit enters a blackhole state and prohibits the user from making any further attempts at providing the valid key for the integrated circuit,
   wherein the lockout circuit comprises one or more XOR logic circuits,
   embedded with the one or more multiplexers, wherein one of the one or more XOR logic circuits are directly connected to the one or more multiplexers, and
   wherein the lockout circuit is configured to only output a partial lockout indication or a full-lockout indication in the blackhole state for every attempt at providing a key until the valid key is applied to a separate recovery input of the integrated circuit to exit the blackhole state.

2. The system of claim 1, wherein the one or more XOR logic circuits are in non-critical paths of the integrated circuit.

3. The system of claim 2, wherein the XOR logic circuits are configured to check that an input key matches a key set for the integrated circuit.

4. The system of claim 3, wherein the lockout circuit further comprises a counter element configured to compare a count of the failed attempts with the threshold number.

5. The system of claim 4, wherein when the count reaches the threshold number, the obfuscation circuit is configured to be locked out by the lockout circuit by entering a blackhole state.

6. The system of claim 1, further comprising:
   a controller embedded in the integrated circuit to extract the valid key for the integrated circuit from an output response of the key obfuscation circuit.

7. The system of claim 6, wherein the valid key comprises a 128-bit key.

8. The system of claim 1, wherein the valid key is a multiplexer-based key at one or more obfuscating points in a register transfer level (RTL) datapath.

9. The system of claim 1, wherein the lockout circuit is embedded at an output of the key obfuscated circuit.

10. An integrated circuit design lockout system comprising:
    an integrated circuit;
    a key obfuscated circuit embedded with the integrated circuit, wherein the key obfuscated circuit is configured to verify that a user provides a valid key for the integrated circuit before the user is allowed to operate the integrated circuit; and
    a lockout circuit embedded with the key obfuscated circuit, wherein the lockout circuit is configured to allow for a threshold number of failed attempts for the user to provide the valid key before the lockout circuit enters a blackhole state and prohibits the user from making any further attempts at providing the valid key for the integrated circuit,
    wherein the key obfuscation circuit comprises one or more multiplexers in non-critical paths of the integrated circuit,
    wherein the lockout circuit comprises one or more XOR logic circuits
    embedded with the one or more multiplexers, and
    wherein the lockout circuit is configured to only output a partial lockout indication or a full lockout indication in the blackhole state for every attempt at providing a key until the valid key is applied to a separate recovery input of the integrated circuit to exit the blackhole state.

11. A method for implementing a key lockout security measure for an integrated circuit comprising:
    embedding one or more circuit elements in the integrated circuit, the one or more circuit elements comprising one or more multiplexers;
    verifying, by the one or more circuit elements, that a user provides a valid key for the integrated circuit before the user is allowed to operate the integrated circuit;
    maintaining, by the one or more circuit elements, a count of a number of failed attempts in which an invalid key is provided by the user that does not match the valid key for the integrated circuit; and
    upon the count of the failed attempts meeting a predefined threshold, entering a blackhole state and locking, by the one or more circuit elements, the integrated circuit from being operated by the user, wherein the one or more circuit elements comprises one or more XOR logic circuits, wherein the one or more XOR logic circuits are embedded with the one or more multiplexers, wherein a first XOR logic circuit of the one or more XOR logic circuits is directly connected to a first multiplexer of the one or more multiplexers, and wherein the one or more circuit elements is configured to exit the blackhole state upon the valid key being applied to a separate recovery input of the integrated circuit.

12. The method of claim 11, wherein the verifying operation is performed during startup of the integrated circuit.

13. The method of claim 11, further comprising recovering from a lockout state by inputting the valid key by the user to a separate recovery input for the integrated circuit.

14. The method of claim 11, wherein the one or more circuit elements comprise a key obfuscated circuit and a lockout circuit, wherein the one or more XOR logic circuits are in non-critical paths of the integrated circuit.

15. The method of claim 14, further comprising:
embedding a controller element in the integrated circuit; and
extracting, by the controller element, the valid key for the integrated circuit from an output response of the key obfuscation circuit.

16. The method of claim 14, wherein the XOR logic circuits checks that an input key matches a key set for the integrated circuit.

17. The method of claim 14, wherein the lockout circuit further comprises a counter element, the method further comprising comparing, by the counter element, a count of the failed attempts with the predefined threshold.

18. The method of claim 17, wherein when the count reaches the predefined threshold, the method further comprises locking, by the lockout circuit, the obfuscation circuit by entering the blackhole state.

19. The method of claim 11, wherein the one or more circuit elements comprise a key obfuscated circuit and a lockout circuit, wherein the key obfuscation circuit comprises the one or more multiplexers in non-critical paths of the integrated circuit.

20. The method of claim 11, further comprising:
embedding a controller element in the integrated circuit; and
extracting, by the controller element, the valid key for the integrated circuit from an output response of the key obfuscation circuit.

21. The method of claim 11, wherein an output of the first multiplexer and an input of the first multiplexer are connected to a first input and a second input of the first XOR logic circuit, respectively.

* * * * *